United States Patent
Suenaga et al.

(10) Patent No.: US 12,476,516 B2
(45) Date of Patent: Nov. 18, 2025

(54) BRUSHLESS MOTOR, ELECTRIC WORK MACHINE, AND BRUSHLESS-MOTOR MANUFACTURING METHOD

(71) Applicant: MAKITA CORPORATION, Anjo (JP)

(72) Inventors: Mitsuo Suenaga, Anjo (JP); Keita Mizukoshi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 436 days.

(21) Appl. No.: 18/329,684

(22) Filed: Jun. 6, 2023

(65) Prior Publication Data

US 2023/0412040 A1 Dec. 21, 2023

(30) Foreign Application Priority Data

Jun. 16, 2022 (JP) .................................. 2022-097087

(51) Int. Cl.
*H02K 7/00* (2006.01)
*B23D 49/16* (2006.01)
*H02K 15/02* (2006.01)

(52) U.S. Cl.
CPC ............. *H02K 7/003* (2013.01); *B23D 49/16* (2013.01); *H02K 15/02* (2013.01)

(58) Field of Classification Search
CPC ......... H02K 7/003; H02K 15/02; B23D 49/16
See application file for complete search history.

(56) References Cited

U.S. PATENT DOCUMENTS

| | | | | |
|---|---|---|---|---|
| 3,997,803 A | * | 12/1976 | Mishra | H02K 1/32 310/59 |
| 4,035,677 A | * | 7/1977 | Kusayama | H02K 1/27 968/493 |

FOREIGN PATENT DOCUMENTS

JP 2004180387 A 6/2004

* cited by examiner

*Primary Examiner* — Terrance L Kenerly
(74) *Attorney, Agent, or Firm* — J-TEK LAW PLLC; Jeffrey D. Tekanic; Scott T. Wakeman

(57) ABSTRACT

A brushless motor (6) includes: a rotor (25), which rotates about a rotational axis (AX); and a stator (24), which is disposed around the rotor and comprises one or more coils (29). The rotor comprises a rotor core (31) and a rotor shaft (33), which is disposed in a shaft hole (60) of the rotor core. The rotor shaft includes: a thinner-diameter force-fitting segment (82), which is force-fit into the shaft hole with a first amount of force-fitting interference; and a thicker-diameter force-fitting segment (79), which is disposed at a location different from that of the thinner-diameter force-fitting segment in a front-rear direction parallel to the rotational axis and which is force-fit into the shaft hole with a second amount of force-fitting interference that is larger than the first amount of force-fitting interference.

20 Claims, 19 Drawing Sheets

FIG.15
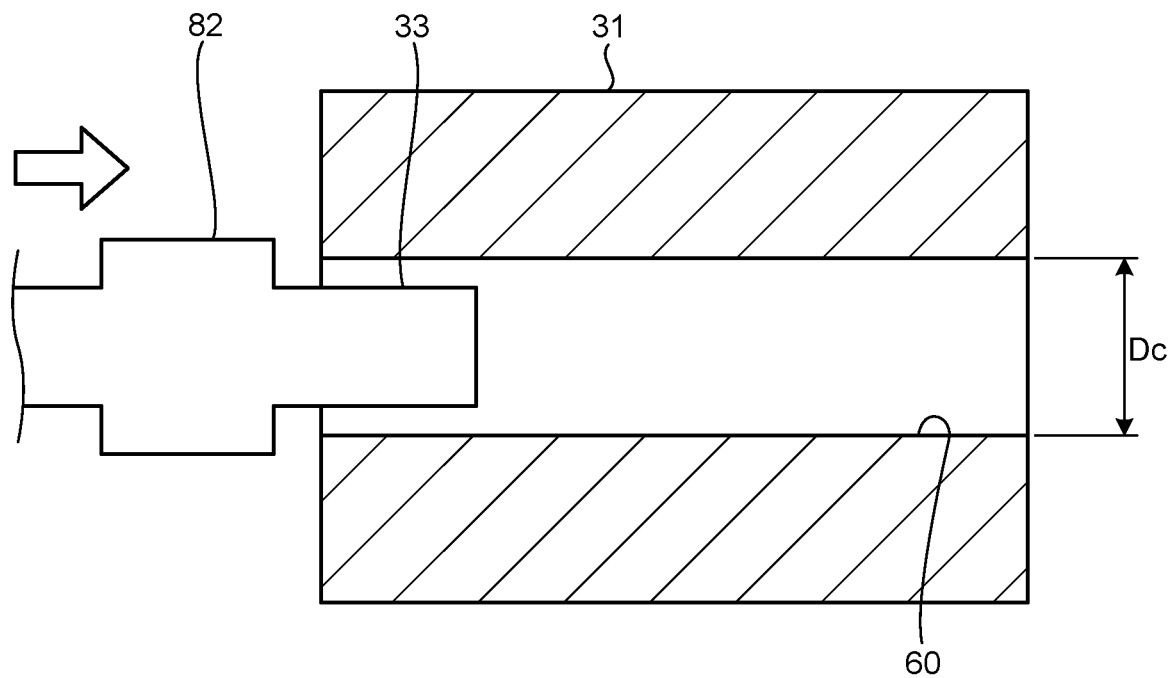
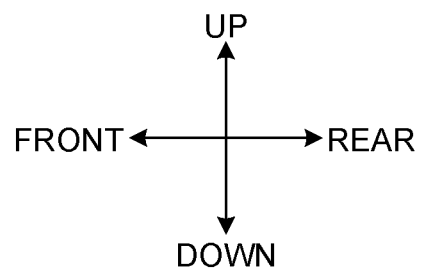

FIG.16
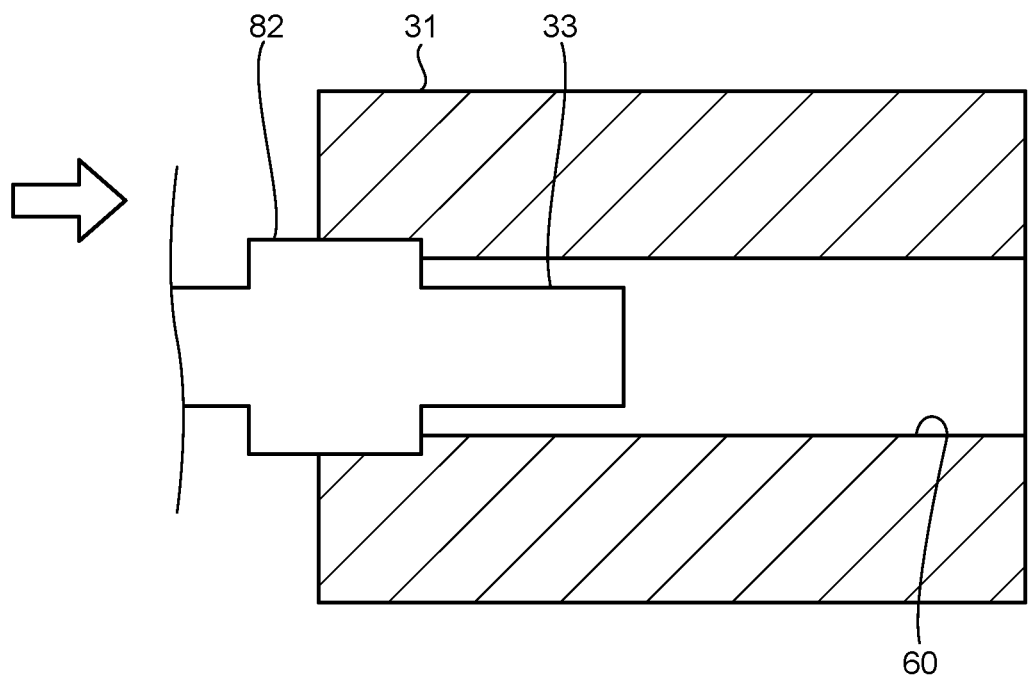
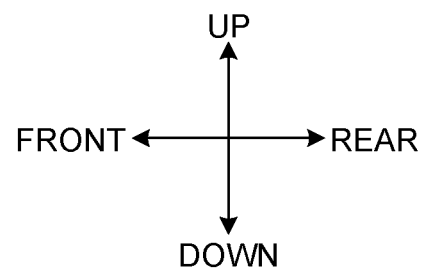

FIG.17
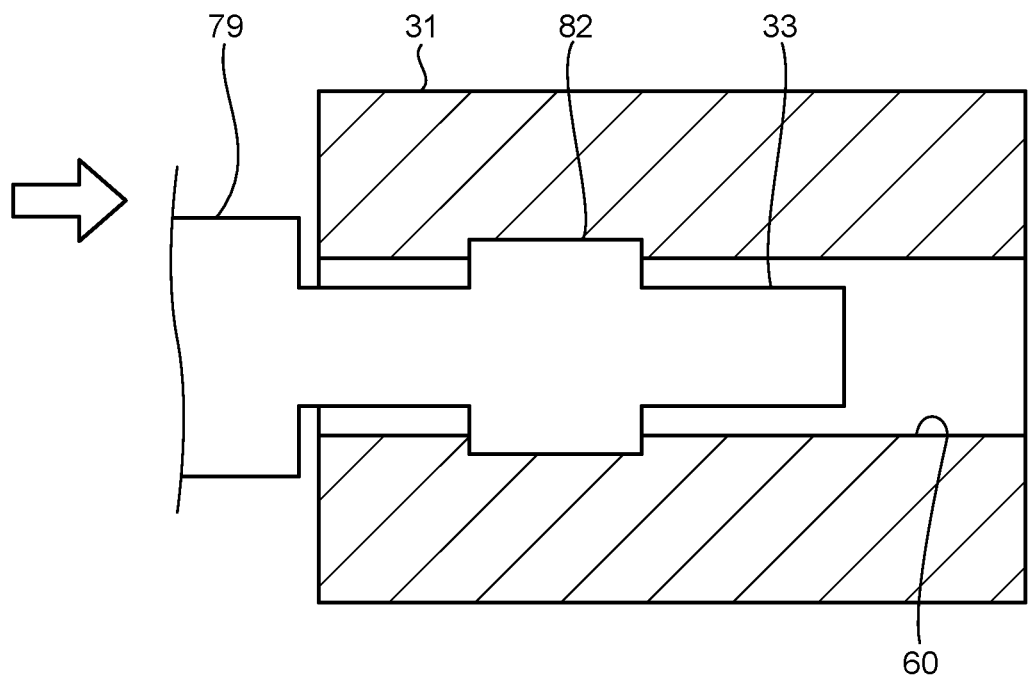
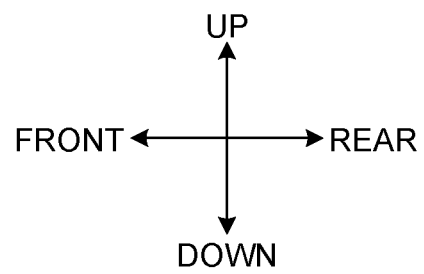

FIG.18
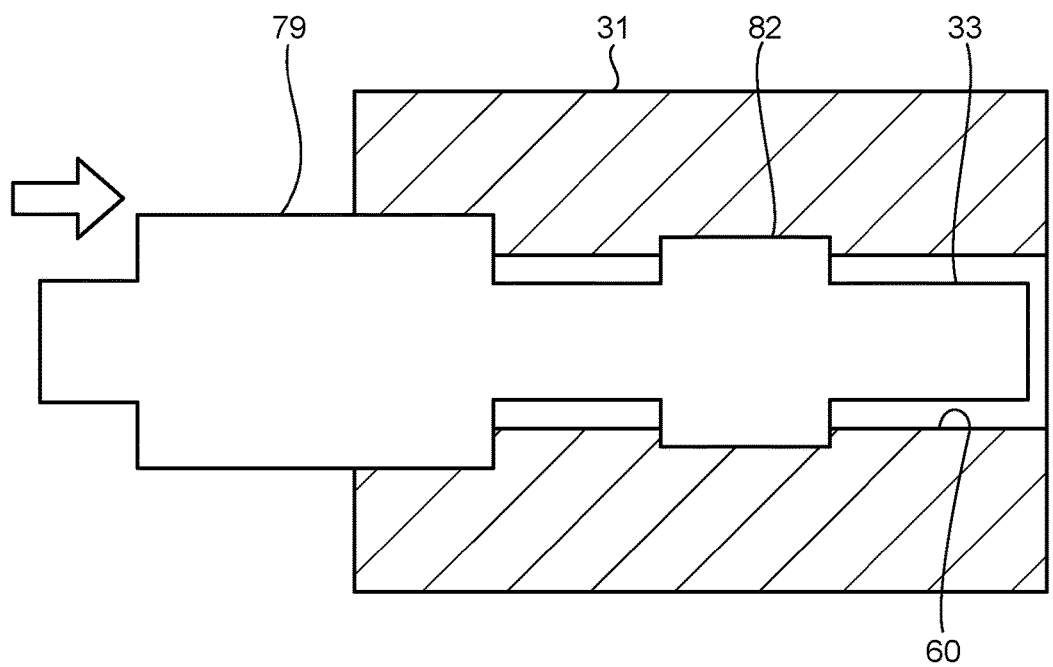
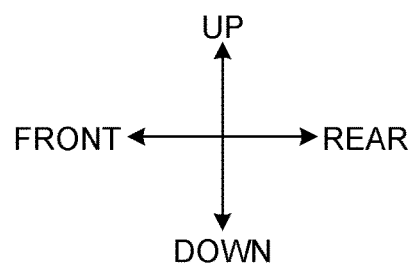

FIG.19
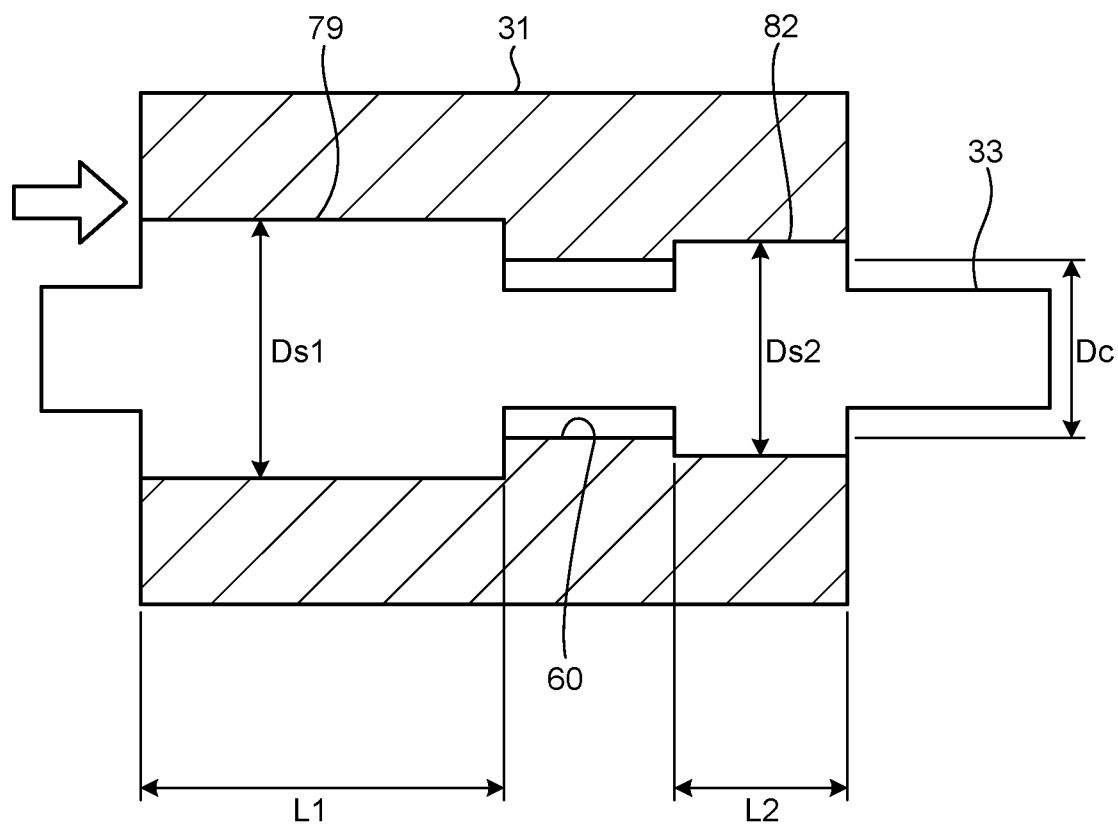
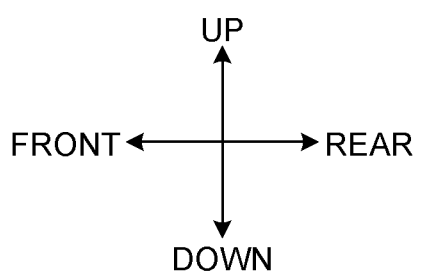

BRUSHLESS MOTOR, ELECTRIC WORK MACHINE, AND BRUSHLESS-MOTOR MANUFACTURING METHOD

CROSS-REFERENCE TO RELATED APPLICATION

This application claims priority to Japanese patent application no. 2022-097087 filed on Jun. 16, 2022, the contents of which are fully incorporated herein by reference.

TECHNICAL FIELD

The techniques disclosed in the present specification relate to a brushless motor, an electric work machine, and to a brushless-motor manufacturing method.

BACKGROUND ART

Japanese Laid-open Patent Publication 2004-180387 discloses a brushless motor, in which an armature (rotor) shaft having linear (axially-extending) protuberances (which serve as force-fitting interference structures) is force-fit into a rotor core.

SUMMARY

In the above-mentioned prior art reference, there is a possibility that, during the making (formation) of the linear protuberances, the rotor shaft (armature shaft) could be bent in an undesirable manner. In addition, when the armature (rotor) shaft having such linear protuberances is force-fit into the rotor core, there is a possibility that the central (rotational) axis of the rotor core and the central (rotational) axis of the rotor shaft will become offset from each other (misaligned) in an undesirable manner; i.e. the rotational axes of the rotor shaft and the rotor core are not colinear in the final assembled state. Thus, if the rotor shaft were to be bent during the manufacturing of the protuberances, and/or if the central axis of the rotor core and the central axis of the rotor shaft were to become offset from each other (misaligned) such that their rotational axes are not colinear during the force-fitting of the rotor shaft into the rotor core, then the rotational balance of the rotor will be negatively affected. If the rotational balance of the rotor is negatively affected, then the performance of the brushless motor will also be negatively affected. In this regard, it is noted that the rotational speed and the stall torque are relatively low in brushed motors. Therefore, linear protuberances could be used in brushed motors and minor bending and/or misalignment of rotational axes might not significantly negatively affect motor performance. On the other hand, the rotational speed is higher and the stall torque is larger in brushless motors, Therefore, it is necessary to increase the rotation-fixing force between the rotor core and the rotor shaft in a brushless motor, in order to avoid a negative effect on the motor performance. However, in a one-step force-fitting process according to known techniques, the rotation-fixing force might be insufficient.

It is one non-limiting object of the present teachings to disclose techniques for avoiding a decrease in the performance of a brushless motor caused by the motor manufacturing process. In other words, it is one non-limiting object to disclose techniques for improving the alignment of the rotor shaft and the rotor core in a brushless motor while also providing a rigid (strong) interference fit of the rotor shaft in the rotor core.

SUMMARY

In one non-limiting aspect of the present teachings, a brushless motor may comprise: a rotor, which rotates about a rotational axis; and a stator, which is disposed around the rotor and comprises one or more coils. The rotor may comprise a rotor core and a rotor shaft, which is disposed in a shaft hole of the rotor core. The rotor shaft may comprise: a thicker-diameter force-fitting segment, which is force-fit into the shaft hole with a first amount of force-fitting interference; and a thicker-diameter force-fitting segment, which is disposed at a location different (axially spaced apart) from that of the thicker-diameter force-fitting segment in a front-rear (axial) direction parallel to (or colinear with) the rotational axis and which is force-fit into the shaft hole with a second amount of force-fitting interference that is larger than the first amount of force-fitting interference. Here, "force-fitting interference" or simply "interference" refers to the amount that the outer diameters of the respective segments of the rotor shaft exceed the inner diameter of the shaft hole.

Effects of the Invention

By utilizing techniques disclosed in the present specification, a decrease in the performance of a brushless motor is less likely to occur or may be avoided entirely. In other words, brushless motor performance is less likely to be negatively impaired by an improper or non-ideal force-fit.

BRIEF DESCRIPTION OF THE DRAWINGS

FIG. 15 is a cross-sectional view that schematically shows a first step of inserting (force-fitting) the rotor shaft into the shaft hole according to the embodiment.

FIG. 16 is a cross-sectional view that schematically shows a second step of inserting the rotor shaft into the shaft hole according to the embodiment.

FIG. 17 is a cross-sectional view that schematically shows a third step of inserting the rotor shaft into the shaft hole according to the embodiment.

FIG. 18 is a cross-sectional view that schematically shows a fourth step of inserting the rotor shaft into the shaft hole according to the embodiment.

FIG. 19 is a cross-sectional view that schematically shows the rotor shaft, which has been inserted into the shaft hole, according to the embodiment.

DETAILED DESCRIPTION OF THE INVENTION

Figure 1:
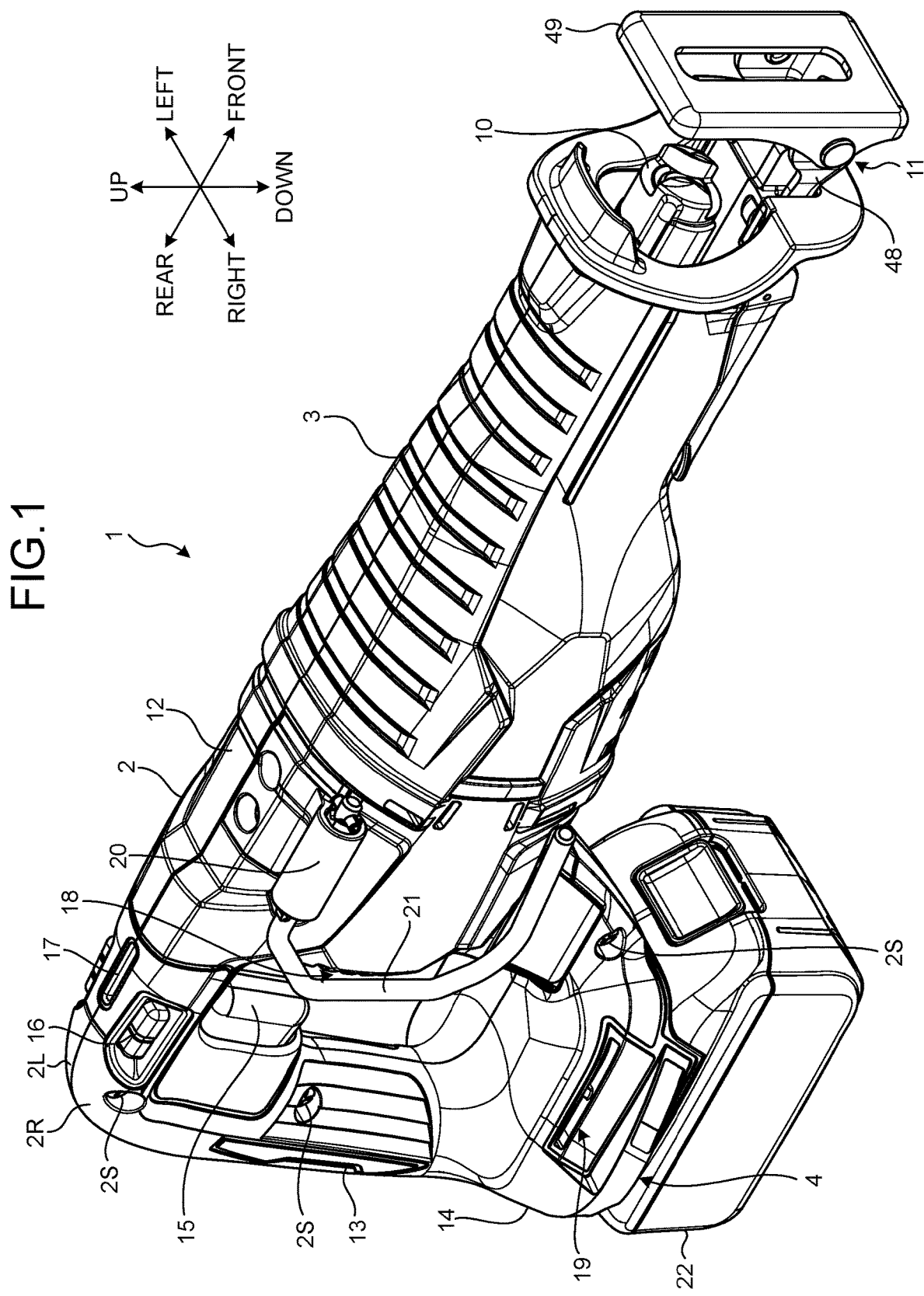
FIG. 1 is an oblique view, viewed from the front, that shows an electric work machine according to one representative embodiment of the present teachings.

As was noted above, a brushless motor may comprise: a rotor, which rotates about a rotational axis; and a stator, which is disposed around the rotor and comprises one or more coils. The rotor may comprise a rotor core and a rotor shaft, which is disposed in a shaft hole of the rotor core. The rotor shaft may comprise: a thinner-diameter force-fitting segment, which is force-fit into the shaft hole with a first amount of force-fitting interference; and a thinner-diameter force-fitting segment, which is disposed at a location different from that of the thinner-diameter force-fitting segment in a front-rear direction parallel to the rotational axis and which is force-fit into the shaft hole with a second amount of force-fitting interference that is larger than the first amount of force-fitting interference. In other words, the thicker-diameter force-fitting segment has a larger outer diameter than the outer diameter of the thinner-diameter force-fitting segment, such that the amount of interference between the thicker-diameter force-fitting segment and the shaft hole is greater than the amount of interference between the thinner-diameter force-fitting segment and the shaft hole.

According to the above-mentioned configuration, the rotor core and the rotor shaft are fixed to each other by force-fitting both the thicker-diameter force-fitting segment and the thinner-diameter force-fitting segment into the shaft hole of the rotor core. During the making (formation, e.g., cutting, grinding, and/or honing) of the thicker-diameter force-fitting segment and the thinner-diameter force-fitting segment, undesirable bending of the rotor shaft is less likely to occur or may be avoided entirely. In addition, offset between the central axis of the rotor core and the central axis of the rotor shaft is less likely to occur or may be avoided entirely owing to the surface force-fitting, because both an outer-circumferential surface of the thicker-diameter force-fitting segment and an outer-circumferential surface of the thinner-diameter force-fitting segment are brought into tight (snug, high pressure) contact with an inner-circumferential surface of the shaft hole. Consequently, degradation in the rotational balance of the rotor caused by the force-fitting process is less likely to occur or may be avoided entirely. In addition, the rotor core and the rotor shaft are rigidly fixed to each other owing the surface force-fitting (as opposed to a line force-fitting, as in the above-described prior art reference) of both the outer-circumferential surface of the thicker-diameter force-fitting segment and the outer-circumferential surface of the thinner-diameter force-fitting segment into the inner-circumferential surface of the shaft hole. Consequently, undesirable rotation of the rotor core and the rotor shaft relative to each other during operation, undesirable movement (axial shifting) of the rotor core and the rotor shaft relative to each other in the axial direction during operation, and the like are less likely to occur or may be avoided entirely. Accordingly, the manufacturing process is less likely to have a detrimental effect on the performance of the brushless motor.

In one or more embodiments, in a cross section orthogonal to the rotational axis, the outer shapes of the thicker-diameter force-fitting segment and the thinner-diameter force-fitting segment each may be circular shaped.

According to the above-mentioned configuration, the rotational balance of the rotor can be improved.

In one or more embodiments, the thinner-diameter force-fitting segment may be disposed more rearward than the thicker-diameter force-fitting segment. The rotor shaft may comprise a thinner-diameter-force-fitting guide (tapered) segment, the diameter of which narrows (tapers) in the direction that extends rearward from a rear-end portion of the thinner-diameter force-fitting segment.

According to the above-mentioned configuration, the thinner-diameter-force-fitting guide segment facilitates the force-fitting of the thinner-diameter force-fitting segment into the shaft hole. In addition, the thinner-diameter-force-fitting guide segment reduces the likelihood of damage to the rotor core during the force-fitting process because the generation of excessive stress concentration in the rotor core when the thinner-diameter force-fitting segment is force-fit into the shaft hole is less likely to occur or may be avoided entirely.

In one or more embodiments, the rotor shaft may comprise a thicker-diameter-force-fitting guide segment, which is disposed between the thicker-diameter force-fitting segment and the thinner-diameter force-fitting segment in the front-rear direction. The (outer) diameter of thicker-diameter-force-fitting guide segment narrows in the direction that extends rearward from the rear-end portion of the thicker-diameter force-fitting segment.

According to the above-mentioned configuration, the thicker-diameter-force-fitting guide segment facilitates the force-fitting of the thicker-diameter force-fitting segment into the shaft hole. In addition, the thicker-diameter-force-fitting guide segment reduces the likelihood of damage to the rotor core during the force-fitting process because the generation of excessive stress concentration in the rotor core when the thicker-diameter force-fitting segment is force-fit into the shaft hole is less likely to occur or may be avoided entirely.

In one or more embodiments, the rotor shaft may comprise a (third) clearance (sunken, recessed) segment, which is disposed between the thinner-diameter force-fitting segment and the thicker-diameter-force-fitting guide segment in the front-rear direction. The (outer) diameter of the (third) clearance part is smaller than the (outer) diameter of the thinner-diameter force-fitting segment.

According to the above-mentioned configuration, when the outer-circumferential surface of the thinner-diameter force-fitting segment is being ground or honed using a grinding wheel or grinding wheels, interference of the grinding wheel(s) with the thicker-diameter force-fitting segment is less likely to occur or may be avoided entirely owing the clearance segment, which provides a clearance or separation between the thicker-diameter force-fitting segment and the thinner-diameter force-fitting segment.

In one or more embodiments, the dimension (axial length) of the thinner-diameter force-fitting segment may be smaller (less) than the dimension (axial length) of the thicker-diameter force-fitting segment in the front-rear direction.

According to the above-mentioned configuration, because the thinner-diameter force-fitting segment is force-fit into the shaft hole prior to the thicker-diameter force-fitting segment being force-fit into the shaft hole, the rotor shaft can be easily force-fit into the shaft hole. In addition, because the thicker-diameter force-fitting segment is longer than the thinner-diameter force-fitting segment, the rotor core and the rotor shaft are rigidly fixed to each other owing to the greater amount of interference between the (axially longer) thicker-diameter force-fitting segment than the thinner-diameter force-fitting segment.

In one or more embodiments, the thinner-diameter force-fitting segment may be disposed more rearward than the thicker-diameter force-fitting segment. A rear-end portion of the thinner-diameter force-fitting segment may be disposed more rearward than a rear-end portion of the rotor core in the assembled state of the brushless motor. Similarly, a front-end portion of the thicker-diameter force-fitting segment may be disposed more forward than a front-end portion of the rotor core in the assembled state of the brushless motor.

According to the above-mentioned configuration, because the thinner-diameter force-fitting segment is not disposed more rearward than the rear-end portion of the rotor core, for example, a sleeve can be more easily force-fit onto the rotor shaft from rearward of the rotor core. In addition, because the thicker-diameter force-fitting segment is disposed more forward than the front-end portion of the rotor core, a relatively large surface area of contact between the outer-circumferential surface of the thicker-diameter force-fitting segment and the inner-circumferential surface of the shaft hole is achieved such that the rotor core and the rotor shaft are rigidly fixed to each other.

In one or more embodiments, an electric work machine may comprise: the above-mentioned brushless motor; and a tool-accessory retaining part, on which a tool accessory is mounted and which is driven by the rotational force of the brushless motor.

According to the above-mentioned configuration, because the rotational balance of the rotor is less likely to be negatively affected by the manufacturing process, the generation of vibration and noise of the electric work machine during an electric work machine operation caused by manufacturing defects is less likely to occur or may be avoided entirely.

In one or more embodiments, the electric work machine may comprise: a gear, which is provided on one-end portion of the rotor shaft; a fan, which is inserted (force-fit) onto the rotor shaft from one-end-portion side of the rotor shaft; a first bearing, which is inserted (force-fit) onto the rotor shaft from one-end-portion side of the rotor shaft; the rotor core, which is force-fit onto the rotor shaft from the other-end-portion side of the rotor shaft; and a second bearing, which is inserted (force-fit) onto the rotor shaft from the other-end-portion side of the rotor shaft.

According to the above-mentioned configuration, the electric work machine is manufactured in a more efficient manner.

In one or more embodiments, a method of manufacturing a brushless motor comprising a rotor, which rotates about a rotational axis, and a stator, which is disposed around the rotor and comprises one or more coils, may comprise: force-fitting, into a shaft hole of a rotor core extending in a front-rear direction parallel to the rotational axis, a rotor shaft comprising a thinner-diameter force-fitting segment, which is force-fit into the shaft hole with a first amount of force-fitting interference, and a thicker-diameter force-fitting segment, which is disposed at a location different from that of the thinner-diameter force-fitting segment in the front-rear direction parallel to the rotational axis and which is force-fit into the shaft hole with a second amount of force-fitting interference that is larger than the first amount of force-fitting interference.

According to the above-mentioned configuration, the rotor core and the rotor shaft are fixed to each other by force-fitting both the thinner-diameter force-fitting segment and the thicker-diameter force-fitting segment into the shaft hole of the rotor core. Owing to this design, undesirable bending of the rotor shaft is less likely to occur or may be avoided entirely during the making (formation) of the thinner-diameter force-fitting segment and the thicker-diameter force-fitting segment. In addition, offset between the central axis of the rotor core and the central axis of the rotor shaft is less likely to occur or may be avoided entirely owing to the surface force-fitting, because an outer-circumferential surface of the thicker-diameter force-fitting segment and an outer-circumferential surface of the thinner-diameter force-fitting segment are both brought into tight (snug, high pressure) contact with an inner-circumferential surface of the shaft hole. Consequently, degradation in the rotational balance of the rotor is less likely to occur or may be avoided entirely. In addition, the rotor core and the rotor shaft are rigidly fixed to each other by the surface force-fitting of both the outer-circumferential surface of the thicker-diameter force-fitting segment and the outer-circumferential surface of the thinner-diameter force-fitting segment into the inner-circumferential surface of the shaft hole. Consequently, undesirable rotation of the rotor core and the rotor shaft relative to each other, undesirable movement of the rotor core and the rotor shaft relative to each other in the axial direction, and the like are less likely to occur or may be avoided entirely. Accordingly, a decrease in the performance of the brushless motor is less likely to occur or may be avoided entirely.

In one or more embodiments, after the thinner-diameter force-fitting segment has been force-fit into the shaft hole, the thicker-diameter force-fitting segment may be force-fit into the shaft hole.

According to the above-mentioned configuration, the thinner-diameter force-fitting segment and the thicker-diameter force-fitting segment are both force-fit into the shaft hole in a suitably tight manner. On the other hand, if the thicker-diameter force-fitting segment were to be (hypothetically) force-fit into the shaft hole prior to the force-fitting of the thinner-diameter force-fitting segment, the rotor core would plastically deform such that the inner diameter of the shaft hole would enlarge in accordance with (to the size of) the diameter of the thicker-diameter force-fitting segment, after which the thinner-diameter force-fitting segment would be inserted into the shaft hole. That is, because there is a possibility that the inner diameter of the shaft hole, which was enlarged in accordance with (to the size of) the diameter of the thicker-diameter force-fitting segment, would be larger than the outer diameter of the thinner-diameter force-fitting segment, the thinner-diameter force-fitting segment might not be force-fittable into the shaft hole in a suitably tight manner. Because the thinner-diameter force-fitting segment is press-fit into the shaft hole prior to the force-fitting of the thicker-diameter force-fitting segment, even if the inner diameter of the shaft hole were to enlarge in accordance with the diameter of the thinner-diameter force-fitting segment, the inner diameter of the enlarged shaft hole would still be smaller than the outer diameter of the thicker-diameter force-fitting segment, and therefore the thicker-diameter force-fitting segment can still be force-fit into the shaft hole in a suitably tight manner.

In one or more embodiments, the thinner-diameter force-fitting segment may be disposed more rearward than the thicker-diameter force-fitting segment. A thinner-diameter-force-fitting guide (tapered) segment, the diameter of which narrows (tapers) in the direction that extends rearward from a rear-end portion of the thinner-diameter force-fitting segment, may be provided on the rotor shaft. After the thinner-diameter-force-fitting guide segment has been inserted onto the shaft hole, the thinner-diameter force-fitting segment may be force-fit into the shaft hole.

According to the above-mentioned configuration, the thinner-diameter-force-fitting guide segment facilitates the force-fitting of the thinner-diameter force-fitting segment into the shaft hole. In addition, the thinner-diameter-force-fitting guide segment reduces the likelihood that damage to the rotor core will occur because the generation of excessive stress concentration in the rotor core when the thinner-diameter force-fitting segment is force-fit into the shaft hole is less likely to occur or may be avoided entirely.

In one or more embodiments, a thicker-diameter-force-fitting guide (tapered) segment, the diameter of which narrows in the direction that extends rearward from a rear-end portion of the thicker-diameter force-fitting segment, may be provided on the rotor shaft between the thinner-diameter force-fitting segment and the thicker-diameter force-fitting segment in the front-rear direction. After the thicker-diameter-force-fitting guide segment has been inserted into the shaft hole, the thicker-diameter force-fitting segment may be force-fit into the shaft hole.

According to the above-mentioned configuration, the thicker-diameter-force-fitting guide segment facilitates the force-fitting of the thicker-diameter force-fitting segment into the shaft hole. In addition, the thicker-diameter-force-fitting guide segment reduces the likelihood that damage to the rotor core will occur because the generation of excessive stress concentration in the rotor core when the thicker-diameter force-fitting segment is force-fit into the shaft hole is less likely to occur or may be avoided entirely.

In one or more embodiments, the dimension (axial length) of the thinner-diameter force-fitting segment may be smaller (less) than the dimension (axial length) of the thicker-diameter force-fitting segment in the front-rear direction.

According to the above-mentioned configuration, after the thinner-diameter force-fitting segment has been force-fit into the shaft hole, the thicker-diameter force-fitting segment can be easily force-fit into the shaft hole. In addition, because the thicker-diameter force-fitting segment is longer than the thinner-diameter force-fitting segment, the rotor core and the rotor shaft are rigidly fixed to each other due to the longer extent of the higher-pressure contact between the shaft hole and the thicker-diameter force-fitting segment.

In one or more embodiments, an outer-circumferential surface of the thicker-diameter force-fitting segment and an outer-circumferential surface of the thinner-diameter force-fitting segment may each be ground and/or honed such that, in a cross section orthogonal to the rotational axis, the outer shapes of the thicker-diameter force-fitting segment and the thinner-diameter force-fitting segment each become circular shaped.

According to the above-mentioned configuration, by using grinding and/or honing as the method of manufacturing the thicker-diameter force-fitting segment and the thinner-diameter force-fitting segment (as opposed to machining (cutting)), undesirable bending of the rotor shaft is less likely to occur or may be avoided entirely. Accordingly, degradation in the rotational balance of the rotor is less likely to occur or may be avoided entirely.

In one or more embodiments, after the (third) clearance segment, the diameter of which is smaller than the diameter of the thinner-diameter force-fitting segment, has been provided between the thicker-diameter force-fitting segment and the thinner-diameter force-fitting segment in the front-rear direction, the outer-circumferential surface of the thinner-diameter force-fitting segment may be ground and/or honed.

According to the above-mentioned configuration, when the outer-circumferential surface of the thinner-diameter force-fitting segment is being ground and/or honed using a grinding wheel or grinding wheel(s), the (third) clearance segment reduces the likelihood of interference of the grinding wheel(s) with the thicker-diameter force-fitting segment, thereby improving the dimensional accuracy of both the thinner- and thicker-diameter force-fitting segments.

A representative, non-limiting embodiment of the present teachings is explained below, with reference to the drawings. In the embodiment, positional relationships among the parts are explained using the terms left, right, front, rear, up, and down. These terms indicate relative position or direction, wherein the center of an electric work machine 1 is the reference. The electric work machine 1 comprises a motor 6, which serves as the motive power source for the electric work machine 1.

In the embodiment, the direction parallel to rotational axis AX of the motor 6 is called the axial direction where appropriate, the direction that goes around rotational axis AX is called the circumferential direction or the rotational direction where appropriate, and the radial direction of rotational axis AX is called the radial direction where appropriate.

In the embodiment, rotational axis AX extends in the front-rear direction. The axial direction parallel to rotational axis AX is the front-rear direction. In addition, in the radial direction, a location that is proximate to or a direction that approaches rotational axis AX is called radially inward where appropriate, and a location that is distant from or a direction that leads away from rotational axis AX is called radially outward where appropriate.

Electric Work Machine

Figure 2:
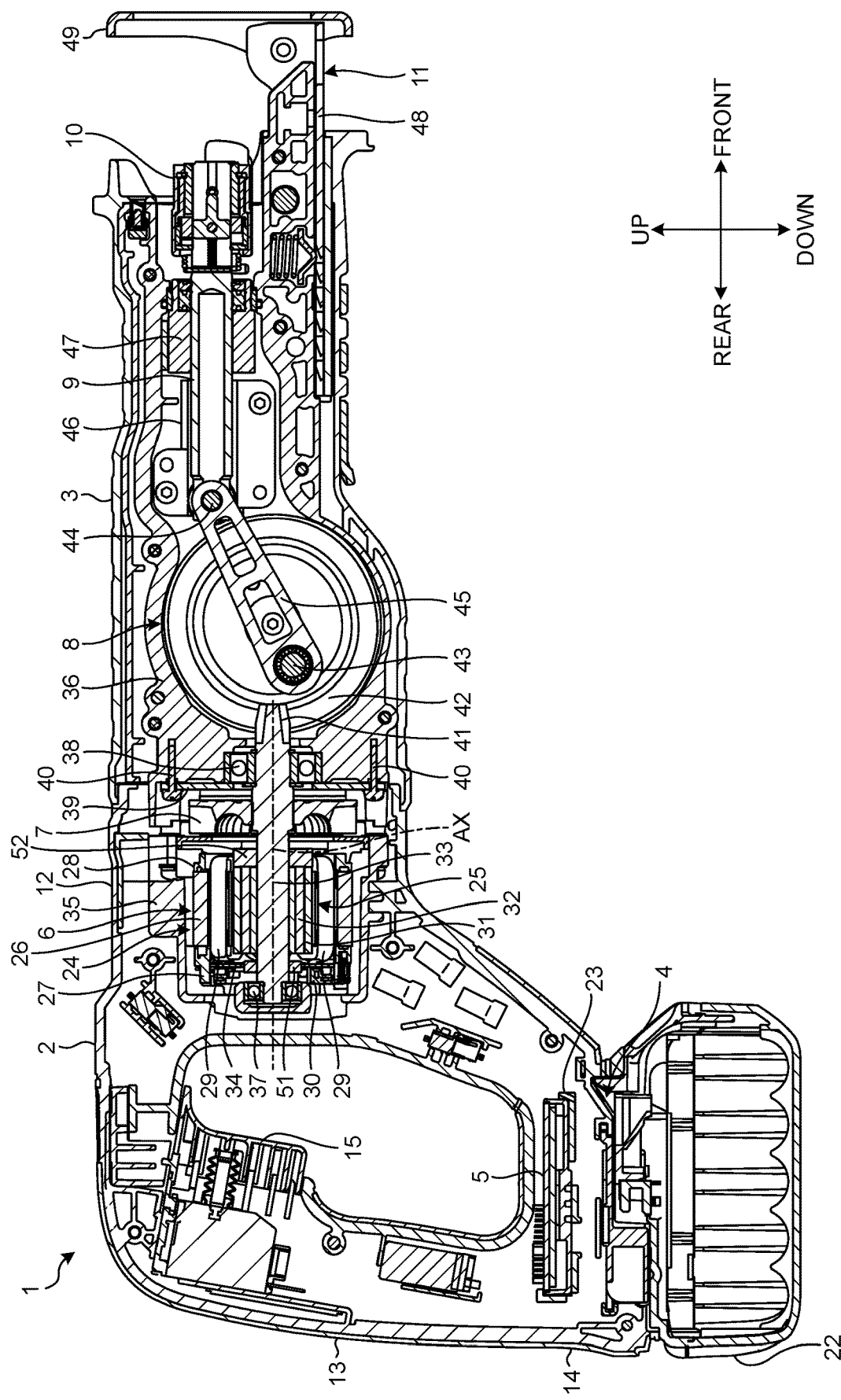
FIG. 2 is a cross-sectional view that shows the electric work machine according to the embodiment.

FIG. 1 is an oblique view, viewed from the front, that shows the electric work machine 1 according to the embodiment. FIG. 2 is a cross-sectional view that shows the electric work machine 1 according to the embodiment. In the embodiment, the electric work machine 1 is a reciprocating saw, which is one non-limiting, representative type of power tool according to the present teachings.

The electric work machine 1 comprises a rear housing 2, a front housing 3, a battery-mounting part 4, a controller 5, the motor 6, a fan 7, a crank mechanism 8, a slider 9, a blade holder 10, and a guide shoe 11.

The rear housing 2 is made of a synthetic resin (polymer), such as nylon (polyamide). The rear housing 2 comprises a left housing 2L and a right housing 2R, which is disposed on the right side of the left housing 2L. The left housing 2L and the right housing 2R constitute a pair of half housings. The rear housing 2 is constituted from the pair of half housings. The left housing 2L and the right housing 2R are fixed to each other by a plurality of screws 2S.

The rear housing 2 includes a motor-housing portion 12, a handle portion 13, and a battery-holding portion 14. The motor-housing portion 12 houses the motor 6. The handle portion 13 is gripped by a user. The battery-holding portion 14 holds a battery pack 22. The handle portion 13 is loop shaped. The motor-housing portion 12 is disposed on the front side of the handle portion 13. The battery-holding portion 14 is disposed on the lower side of the handle portion 13.

A trigger lever 15 is disposed on the handle portion 13. The trigger lever 15 is manipulated (pressed) by the user to start the motor 6. By manipulating the trigger lever 15, the motor 6 is switched between being driven and stopped. A lock-off button 16 is provided at an upper portion of the handle portion 13. The lock-off button 16 is slidable in the left-right direction. By manipulating the lock-off button 16, the locking of the trigger lever 15 is released. A window 17, through which the position of the lock-off button 16 is indicated, is provided on an upper surface of the handle portion 13. A first air-suction port 18 is provided at a rear portion of the motor-housing portion 12. A second air-suction port 19 is provided in the battery-holding portion 14.

A tube-shaped hook holder 20 is provided on a right portion of the motor-housing portion 12. A hook 21 for hanging up the electric work machine 1 is mounted in (pressed into) the hook holder 20 when not in use.

The front housing 3 is disposed on the front side of the rear housing 2. The front housing 3 is tube shaped. A rear-end portion of the front housing 3 is fixed to a front-end portion of the rear housing 2. The front housing 3 houses the crank mechanism 8 and the slider 9.

The battery-mounting part 4 is disposed at a lower portion of the battery-holding portion 14. The battery pack 22 is mounted on the battery-mounting part 4. The battery pack 22 is the power supply of the electric work machine 1. The battery pack 22 is detachable from the battery-mounting part 4. The battery pack 22 is mounted on the battery-mounting part 4 by being inserted into the battery-mounting part 4 from forward of the battery-holding portion 14. The battery pack 22 is demounted from the battery-mounting part 4 by being removed forward from the battery-mounting part 4. The battery pack 22 comprises one or more secondary batteries. In the embodiment, the battery pack 22 comprises rechargeable one or more lithium-ion batteries. When mounted on the battery-mounting part 4, the battery pack 22 can supply electric power to the electric work machine 1. The motor 6 is driven by the electric power (current) supplied from the battery pack 22.

The controller 5 controls at least the motor 6. The controller 5 comprises a circuit board and a plurality of electronic components, which are installed on the circuit board. A microcomputer and switching devices are illustrative examples of electronic components. The controller 5 is housed in a controller case 23, which is in turn housed in the battery-holding portion 14.

The motor 6 is the motive-power source of the electric work machine 1. The motor 6 is an electric motor. The motor 6 is an inner-rotor-type brushless motor. The motor 6 comprises a stator 24 and a rotor 25. The stator 24 is disposed around the rotor 25. The rotor rotates relative to the stator 24. The rotor 25 rotates about rotational axis AX. Rotational axis AX extends in the front-rear direction.

The stator 24 comprises: a tube-shaped stator core 26; a rear insulator 27, which is fixed to a rear portion of the stator core 26; a front insulator 28, which is fixed to a front portion of the stator core 26; a plurality of coils 29, the coils 29 being wound through the rear insulator 27 and the front insulator 28 and around teeth of the stator core 26; and a busbar 30, which shorts (electrically connects) together respective pairs of the coils 29.

The rotor 25 comprises a rotor core 31, permanent magnets 32, and a rotor shaft 33. A first sleeve 51 is fixed to a rear portion of the rotor shaft 33. A second sleeve 52 is fixed to a front portion of the rotor shaft 33. A sensor board 34, which detects rotation of the rotor 25 by detecting the positions of the permanent magnets 32, is mounted on the rear insulator 27.

At least a portion of the motor 6 is housed in a motor case 35. A crank case 36 is disposed forward of the motor case 35. The crank mechanism 8 and the slider 9 are housed in the crank case 36.

The stator 24 is disposed in the interior of the motor case 35. The stator 24 is fixed to (in) the motor case 35. The motor case 35 is fixed to (in) the motor-housing portion 12.

A rear-end portion of the rotor shaft 33 is supported in a rotatable manner by a first rotor bearing 37. A front portion of the rotor shaft 33 is supported in a rotatable manner by a second rotor bearing 38. The first rotor bearing 37 is held in (by) the motor case 35. The second rotor bearing 38 is held in the crank case 36.

The fan 7 is fixed to (interference fit onto) a front portion of the rotor shaft 33. The fan 7 is fixed to the rotor shaft 33 between the stator core 26 and the rotor bearing 38. When the rotor shaft 33 rotates, the fan 7 rotates. Airflow around the motor 6 is generated by the rotation of the fan 7. The motor 6 is cooled by the airflow generated by the rotation of the fan 7.

A retaining plate 39 is disposed at a rear-end portion of the crank case 36. The retaining plate 39 is fixed to a rear-end portion of the crank case 36 by screws 40. The retaining plate 39 contacts a rear-end portion of an outer ring of the rotor bearing 38. The retaining plate 39 obstructs (blocks, retains) the second rotor bearing 38 from coming off rearward from the crank case 36.

A pinion gear 41 is provided on a front-end portion of the rotor shaft 33. The second rotor bearing 38 is disposed between the pinion gear 41 and the fan 7 in the front-rear direction. The pinion gear 41 is disposed in the interior of the crank case 36. The rotor shaft 33 is coupled to the crank mechanism 8 via the pinion gear 41.

The crank mechanism 8 converts the rotational motion of the rotor 25 into reciprocating motion in the front-rear direction. The crank mechanism 8 comprises: a bevel gear 42, to which the pinion gear 41 is coupled; an eccentric pin 43, which is provided at an off-center location of the bevel gear 42; and a connecting rod 45, which couples the eccentric pin 43 and a linking pin 44 provided on a rear-end portion of the slider 9.

The slider 9 is moved in the front-rear direction by the crank mechanism 8. The slider 9 is guided in the front-rear direction by a holder 46 and a slider guide 47.

The blade holder 10 is connected to a front-end portion of the slider 9. The blade holder 10 is moved, together with the slider 9, in the front-rear direction by the crank mechanism 8. The blade holder 10 is driven by the rotational force of the motor 6 transmitted via the crank mechanism 8. The blade holder 10 holds a (saw) blade, which is one type of tool accessory. The blade holder 10 functions as a tool-accessory retaining part, on which the tool accessory is mounted.

The guide shoe 11 is provided on the lower side of the slider 9. The guide shoe 11 comprises: a slide bar 48, which is slidable in the front-rear direction; and a shoe 49, which is fixed to a front-end portion of the slide bar 48 and into which the blade mounted on the blade holder 10 is inserted.

When the trigger lever 15 is manipulated, the motor 6 is driven by the electric power supplied from the battery pack 22. When the rotor 25 rotates about rotational axis AX, the pinion gear 41, which is provided on a front-end portion of the rotor shaft 33, rotates. When the pinion gear 41 rotates, the bevel gear 42, which is coupled to the pinion gear 41, rotates. When the bevel gear 42 rotates, the eccentric pin 43 undergoes eccentric motion relative to the rotational axis of the bevel gear 42, and the slider 9 undergoes reciprocating motion in the front-rear direction via the connecting rod 45. When the slider 9 undergoes reciprocating motion in the front-rear direction, the blade, which is mounted on the blade holder 10, undergoes reciprocating motion in the front-rear direction. An object (e.g., a workpiece) can be cut by the reciprocating motion of the blade in the front-rear direction.

Rotor

Figure 3:
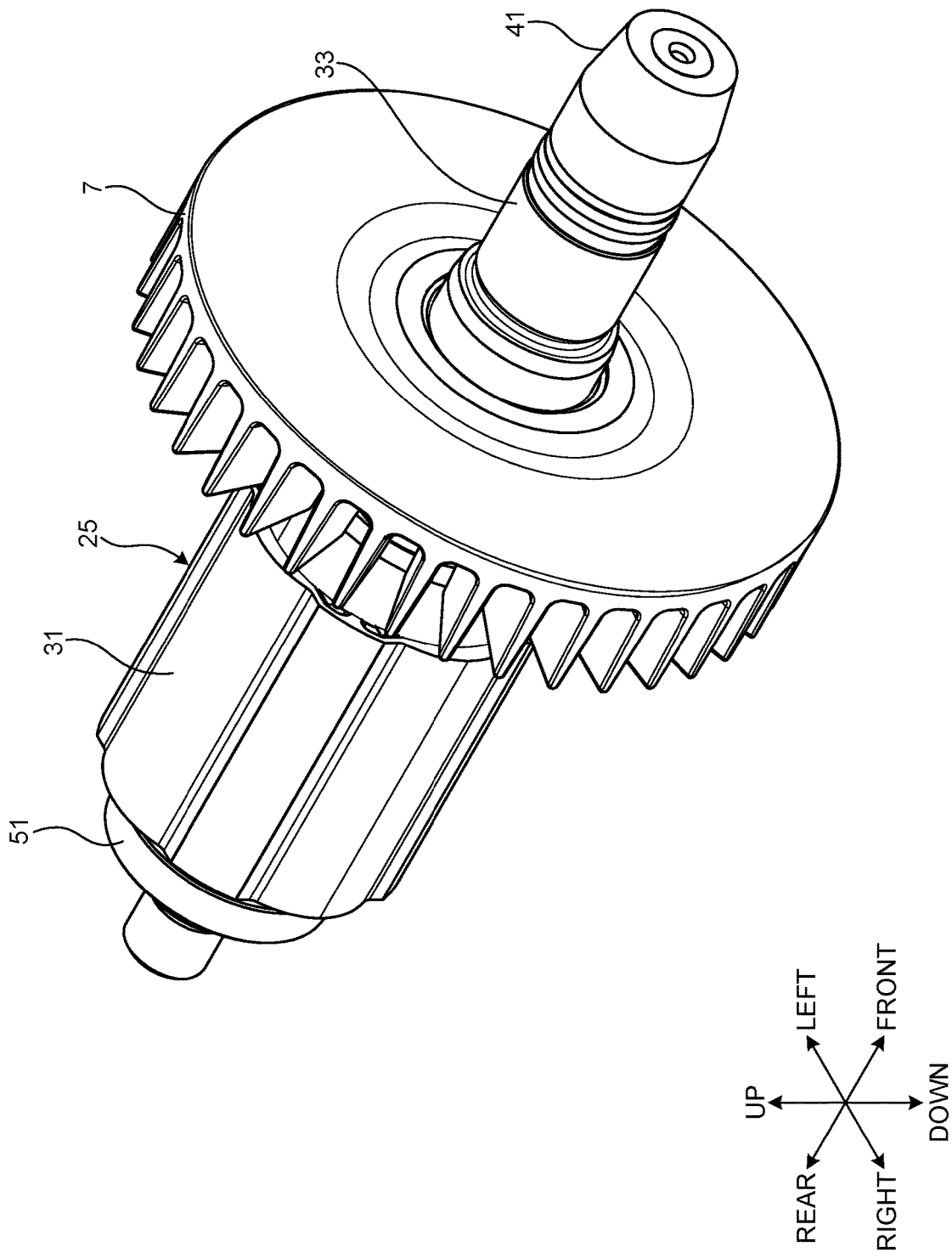
FIG. 3 is an oblique view, viewed from the front, that shows a rotor according to the embodiment.
Figure 4:
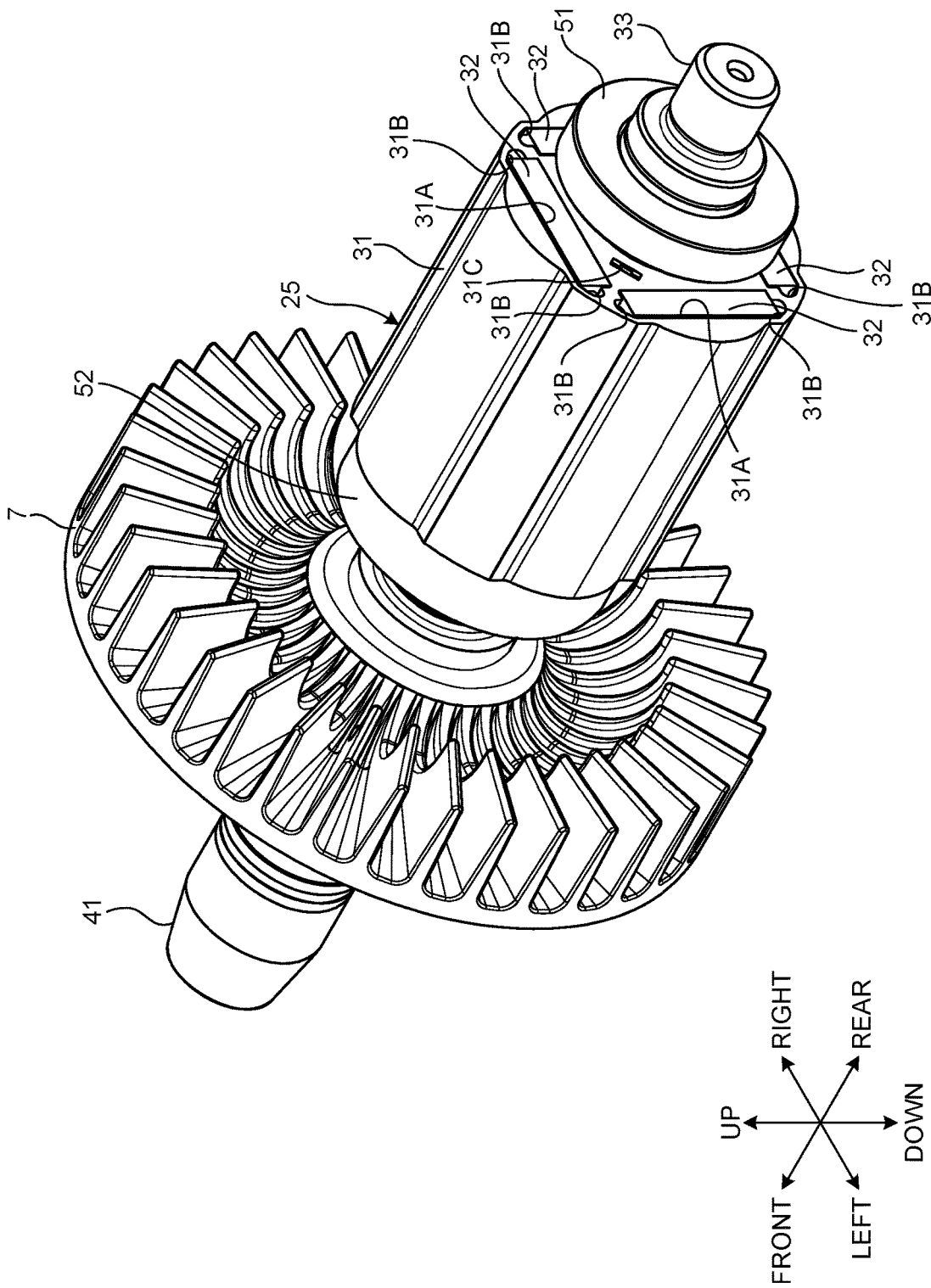
FIG. 4 is an oblique view, viewed from the rear, that shows the rotor according to the embodiment.
Figure 5:
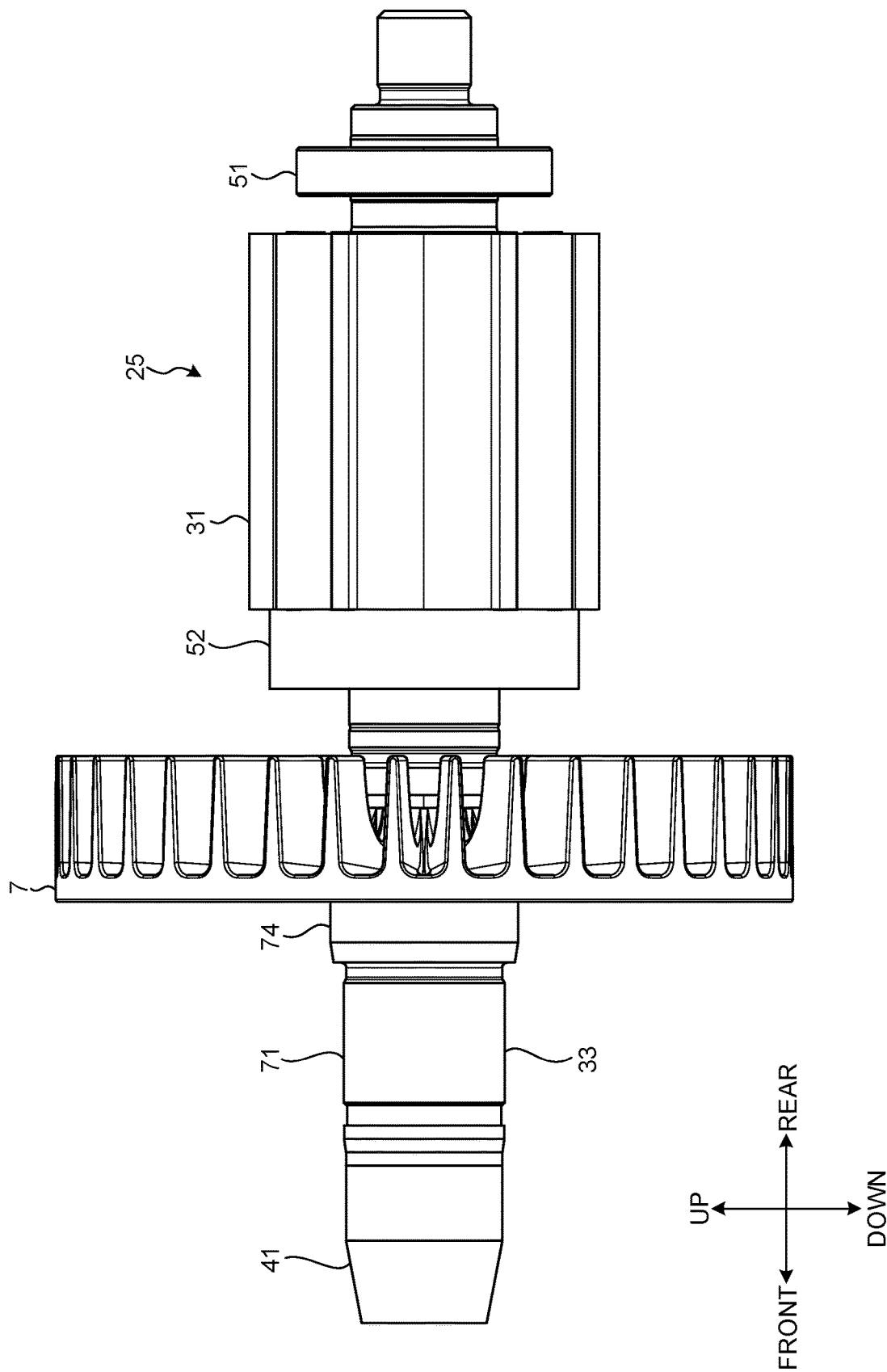
FIG. 5 is a side view that shows the rotor according to the embodiment.
Figure 6:
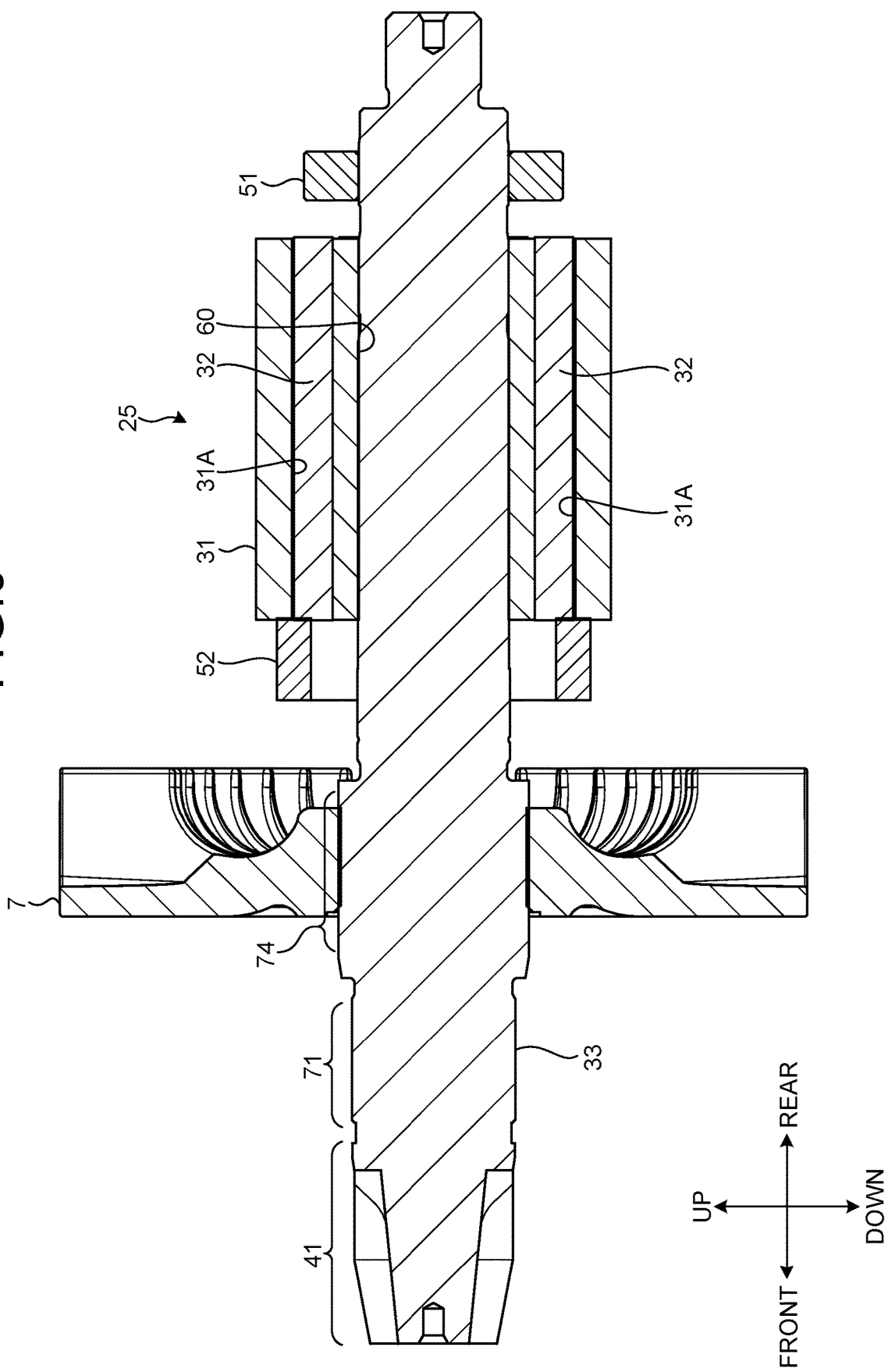
FIG. 6 is a cross-sectional view that shows the rotor according to the embodiment.
Figure 7:
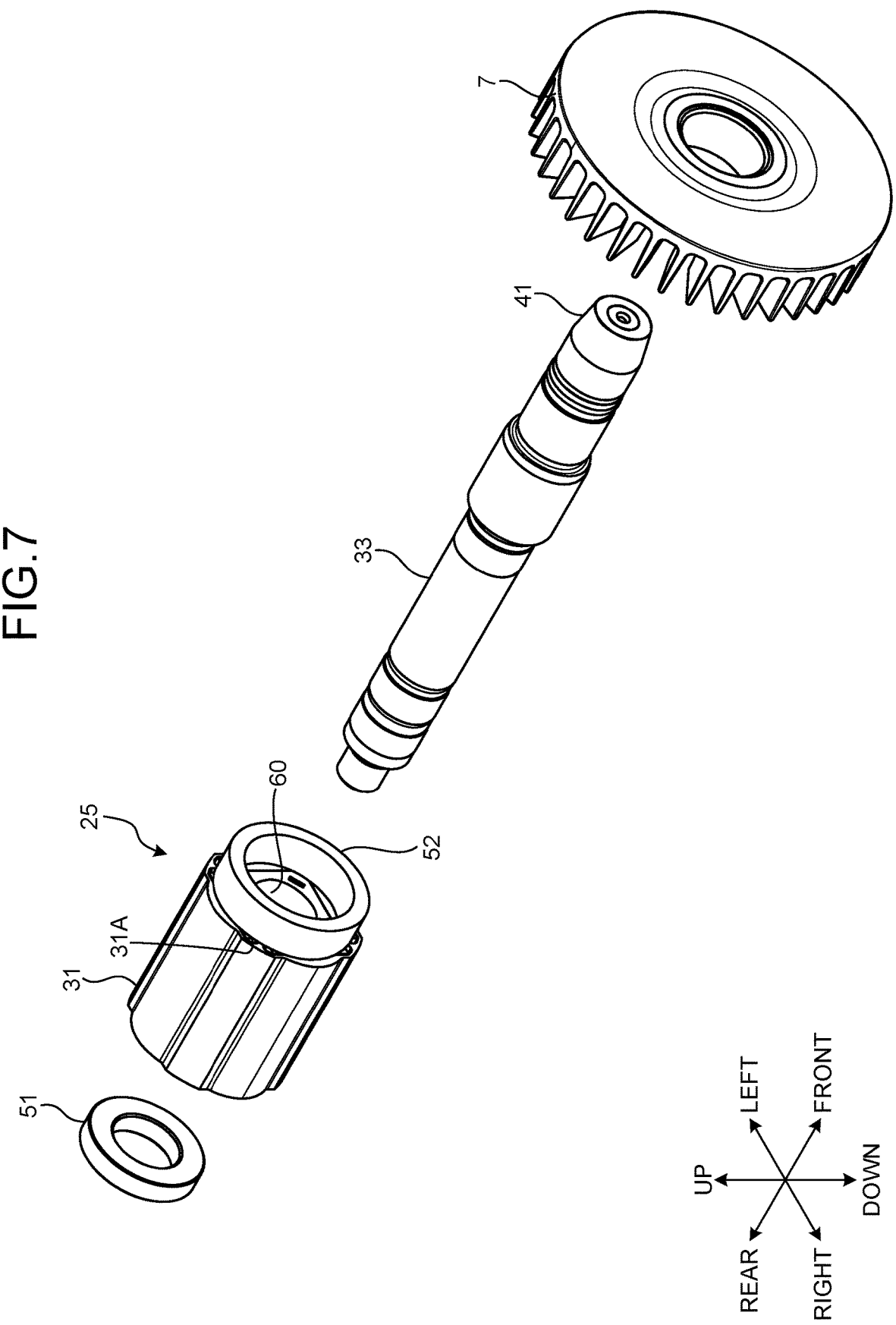
FIG. 7 is an exploded, oblique view, viewed from the front, that shows the rotor according to the embodiment.
Figure 8:
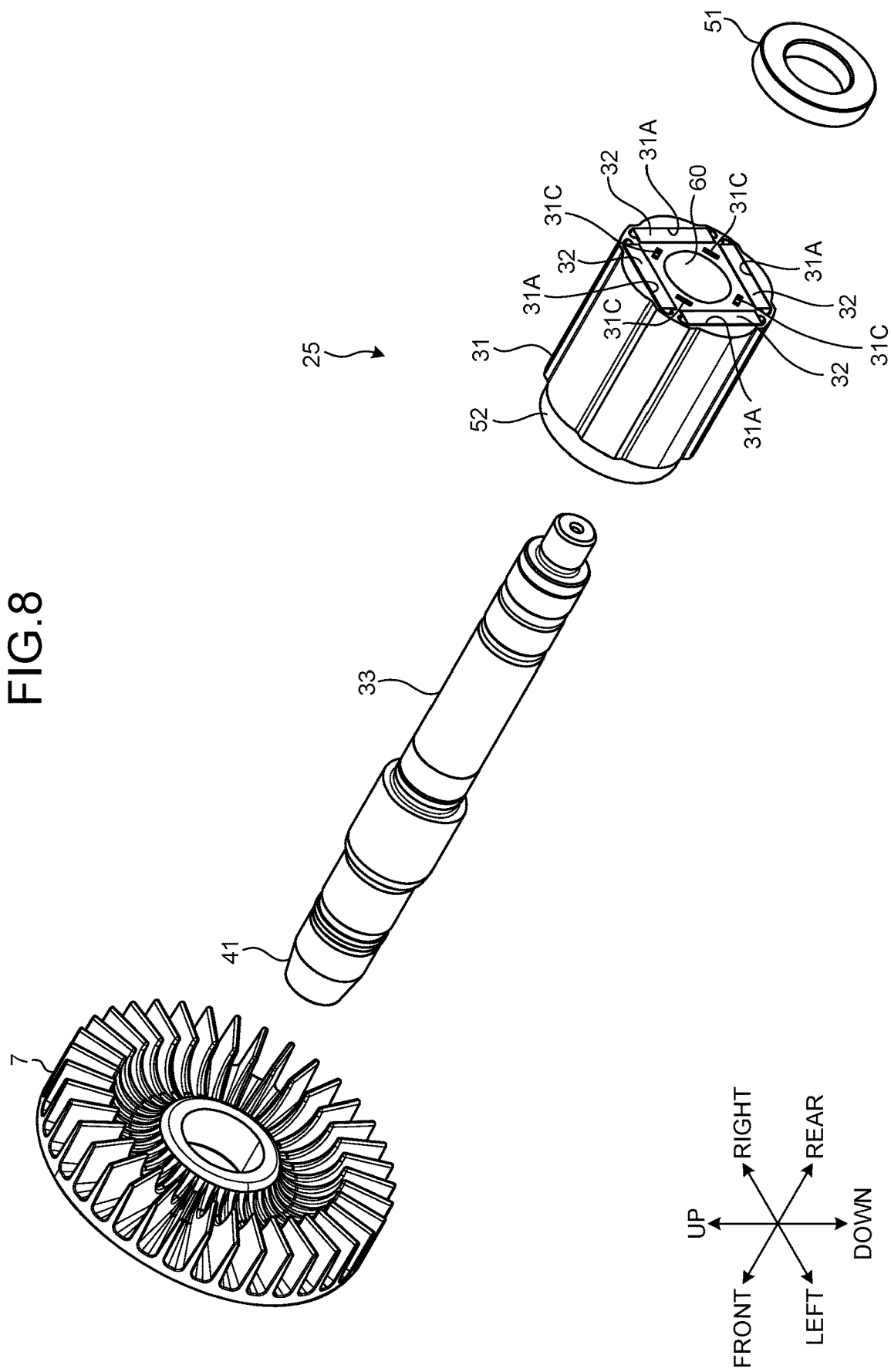
FIG. 8 is an exploded, oblique view, viewed from the rear, that shows the rotor according to the embodiment.

FIG. 3 is an oblique view, viewed from the front, that shows the rotor 25 according to the embodiment. FIG. 4 is an oblique view, viewed from the rear, that shows the rotor 25 according to the embodiment. FIG. 5 is a side view that shows the rotor 25 according to the embodiment. FIG. 6 is a cross-sectional view that shows the rotor 25 according to the embodiment. FIG. 7 is an exploded, oblique view, viewed from the front, that shows the rotor according to the embodiment. FIG. 8 is an exploded, oblique view, viewed from the rear, that shows the rotor 25 according to the embodiment.

The rotor 25 comprises the rotor core 31, the permanent magnets 32, and the rotor shaft 33.

The rotor core 31 is substantially tube shaped. The rotor core 31 comprises a plurality of steel sheets laminated to each other. The steel sheets are fixed to each other by crimping. Crimped parts 31C, which are formed by crimping, are provided in the rotor core 31. The rotor core 31 has a shaft hole 60, which extends in the front-rear direction, and a plurality of magnet holes 31A extending in the front-rear direction. At least a portion of the rotor shaft 33 is disposed in the interior of the shaft hole 60. The permanent magnets 32 are respectively disposed in the interiors of the magnet holes 31A. The lower limit of the outer diameter of the rotor shaft 33 is preferably at least 5 mm, at least 8 mm, at least 10 mm or at least 12 mm, and the upper limit of the outer diameter of the rotor shaft 33 is preferably 20 mm or less, 15 mm or less, at least 13 mm or 12 mm or less. Suitable ranges for the outer diameter of the rotor shaft 33 can be selected by utilizing any of the above-mentioned lower and upper limits of the outer diameter. For example, and without limitation, the outer diameter of the rotor shaft is preferably in the range of 8-15 mm, e.g., 10-13 mm.

The shaft hole 60 is formed so as to pass through both a front-end surface and a rear-end surface of the rotor core 31. In a cross section orthogonal to rotational axis AX, the shaft hole 60 is circular. In the front-rear direction, the inner diameter of the shaft hole 60 is constant. In a cross section orthogonal to rotational axis AX, the shaft hole 60 is provided at the center of the rotor core 31.

The magnet holes 31A are formed so as to pass through the front-end surface and the rear-end surface of the rotor core 31. In a cross section orthogonal to rotational axis AX, each of the magnet holes 31A is substantially oblong (rectangular). The magnet holes 31A are provided radially outward of the shaft hole 60. A plurality of the magnet holes 31A is formed in the circumferential direction. In the embodiment, four of the magnet holes 31A are formed (disposed) equispaced in the circumferential direction. The permanent magnets 32 are respectively disposed in the magnet holes 31A.

Air gaps 31B are formed between surfaces of the permanent magnets 32 disposed in the magnet holes 31A and at least portions of inner surfaces of the magnet holes 31A. The air gaps 31B are provided on one side in the circumferential direction and the other side in the circumferential direction, one on each side, of the permanent magnets 32 disposed in the magnet holes 31A. The air gaps 31B are filled with the synthetic resin. A portion of the synthetic resin forms the second sleeve 52 at a front-end surface of the rotor core 31. The second sleeve 52 is connected to the front-end surface of the rotor core 31.

The first sleeve 51 is fixed to the rotor shaft 33 more rearward than a rear-end surface of the rotor core 31. The fan 7 is fixed to the rotor shaft 33 more forward than the second sleeve 52.

The first sleeve 51 and the second sleeve 52 are each provided to correct the rotational balance of the rotor 25. The first sleeve 51 is made of brass. The second sleeve 52 is made of a synthetic resin. It is noted that both the first sleeve 51 and the second sleeve 52 may be made of synthetic resin or may be made of a metal such as brass. The rotational balance of the rotor 25 is corrected by machining at least one of the first sleeve 51 and the second sleeve 52. The static balance and the dynamic balance of the rotor 25 are improved by at least one of the first sleeve 51 and the second sleeve 52. It is noted that one or both of the first sleeve 51 and the second sleeve 52 may be fixed to the rotor shaft 33.

Rotor Shaft

Figure 9:
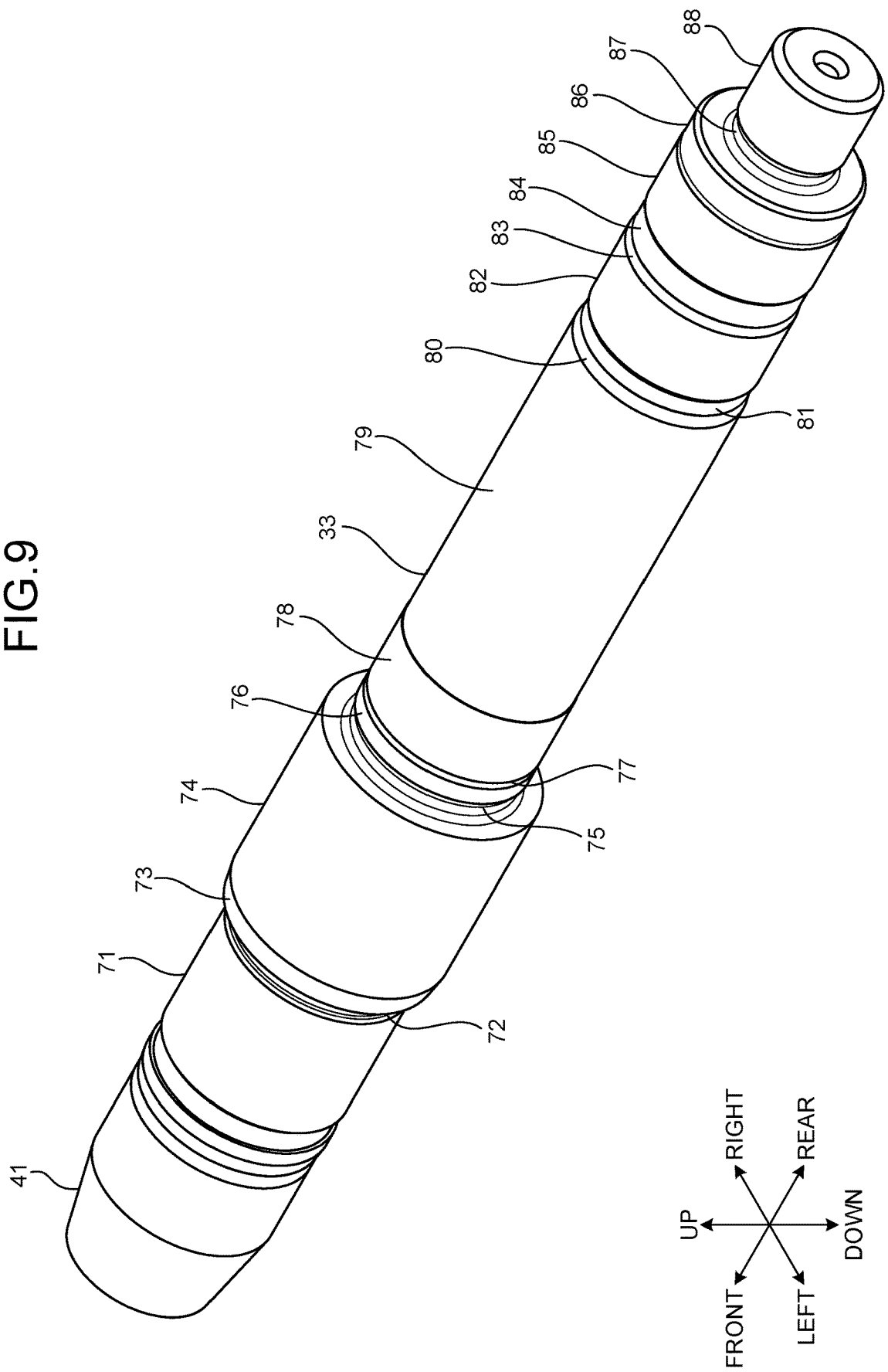
FIG. 9 is an oblique view, viewed from the rear, that shows a rotor shaft according to the embodiment.
Figure 10:
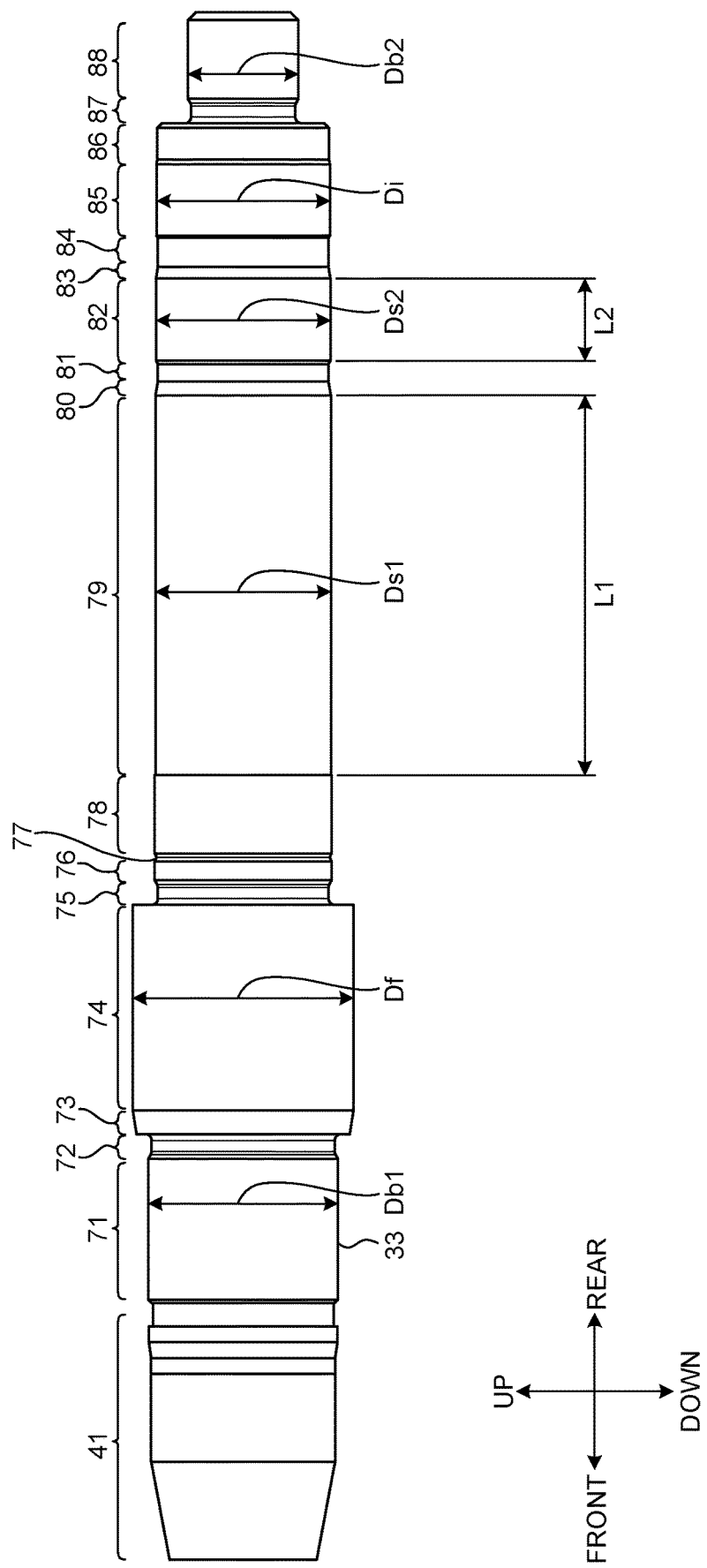
FIG. 10 is a side view that shows the rotor shaft according to the embodiment.

FIG. 9 is an oblique view, viewed from the rear, that shows the rotor shaft 33 according to the embodiment. FIG. 10 is a side view that shows the rotor shaft 33 according to the embodiment. The rotor shaft 33 is elongated in the front-rear direction. The rotor shaft 33 is made of a metal such as iron or steel. In a cross section orthogonal to rotational axis AX, the outer shape of the rotor shaft 33 is circular shaped.

The rotor shaft 33 comprises: the pinion gear 41, which is provided at a front-end portion of the rotor shaft 33; a bearing-retaining segment (part, portion) 71, which is provided on the rear side of the pinion gear 41; a first clearance (sunken, recessed) segment (part, portion) 72, which is provided on the rear side of the bearing-retaining segment 71; a fan-force-fitting guide (tapered) segment (part, portion) 73, which is provided on the rear side of the first clearance segment 72; a fan-force-fitting segment (part, portion) 74, which is provided on the rear side of the fan-force-fitting guide segment 73; and a second clearance segment (part, portion) 75, which is provided on the rear side of the fan-force-fitting segment 74.

In addition, the rotor shaft 33 comprises: a first intermediate segment (part, portion) 76, which is provided on the rear side of the second clearance segment 75; a groove segment (part, portion) 77, which is provided on the rear side of the first intermediate segment 76; and a second intermediate segment (part, portion) 78, which is provided on the rear side of the groove segment 77.

In addition, the rotor shaft 33 comprises: a thicker-diameter force-fitting segment (part, portion) 79, which is provided on the rear side of the second intermediate segment 78; a thicker-diameter-force-fitting guide (tapered) segment (part, portion) 80, which is provided on the rear side of the thicker-diameter force-fitting segment 79; a third clearance segment (part, portion) 81, which is provided on the rear side of the thicker-diameter-force-fitting guide segment 80; a thinner-diameter force-fitting segment (part, portion) 82, which is provided on the rear side of the third clearance segment 81; a thinner-diameter-force-fitting guide (tapered) segment (part, portion) 83, which is provided on the rear side of the thinner-diameter force-fitting segment 82; and a fourth clearance segment (part, portion) 84, which is provided on the rear side of the thinner-diameter-force-fitting guide segment 83.

In addition, the rotor shaft 33 comprises: a sleeve-force-fitting segment (part, portion) 85, which is provided on the rear side of the fourth clearance segment 84; a sleeve-force-fitting guide (tapered) segment (part, portion) 86, which is provided on the rear side of the sleeve-force-fitting segment 85; a clearance (sunken, recessed) segment (part, portion) 87, which is provided on the rear side of the sleeve-force-fitting guide segment 86; and a bearing-retaining segment (part, portion) 88, which is provided on the rear side of the clearance segment 87. The bearing-retaining segment 88 is provided at a rear-end portion of the rotor shaft 33.

The thinner-diameter force-fitting segment 82 and the thicker-diameter force-fitting segment 79 each are force-fit into the shaft hole 60 of the rotor core 31. The thicker-diameter force-fitting segment 79 is disposed at a location in the front-rear direction that is different (axially spaced apart) from that of the thinner-diameter force-fitting segment 82. In the embodiment, the thinner-diameter force-fitting segment 82 is disposed more rearward than the thicker-diameter force-fitting segment 79. In a cross section orthogonal to rotational axis AX, the outer shapes of the thinner-diameter force-fitting segment 82 and the thicker-diameter force-fitting segment 79 each are circular shaped. Diameter Ds2 of the thinner-diameter force-fitting segment 82 and diameter Ds1 of the thicker-diameter force-fitting segment 79 each are larger than inner diameter Dc of the shaft hole 60. Diameter Ds2 of the thinner-diameter force-fitting segment 82 is smaller than diameter Ds1 of the thicker-diameter force-fitting segment 79. Diameter Ds2 of the thinner-diameter force-fitting segment 82 is constant in the front-rear direction. Diameter Ds1 of the thicker-diameter force-fitting segment 79 is constant in the front-rear direction. The thinner-diameter force-fitting segment 82 is force-fit into the shaft hole 60 with a first amount of force-fitting interference. The thicker-diameter force-fitting segment 79 is force-fit with a second amount of force-fitting interference that is larger than the first amount of force-fitting interference of the shaft hole 60.

The first amount of force-fitting interference refers to the difference between inner diameter Dc of the shaft hole 60 and diameter Ds2 of the thinner-diameter force-fitting segment 82. The second amount of force-fitting interference refers to the difference between inner diameter Dc of the shaft hole 60 and diameter Ds1 of the thicker-diameter force-fitting segment 79. In other words, the first amount of force-fitting interference is the amount (in microns) that the nominal outer diameter Ds2 of the thinner-diameter force-fitting segment 82 exceeds the nominal inner diameter Dc of the shaft hole 60. The second amount of force-fitting interference is the amount (in millimeters) that the nominal outer diameter Ds1 of the thicker-diameter force-fitting segment 79 exceeds the nominal inner diameter Dc of the shaft hole 60. The nominal inner diameter Dc of the shaft hole 60 is constant along the front-rear (axial) direction. As was noted above, because the nominal outer diameter Ds1 of the thicker-diameter force-fitting segment 79 is greater than the nominal outer diameter Ds2 of the thinner-diameter force-fitting segment 79, the first amount of force-fitting interference is greater than the second amount of force-fitting interference because the nominal inner diameter Dc of the shaft hole 60 is constant along the front-rear (axial) direction. Thus, the (first) amount of friction per unit length between the thinner-diameter force-fitting segment 82 and the shaft hole 60 is less than the (second) amount of friction per unit length between the thicker-diameter force-fitting segment 79 and the shaft hole 60. In the alternative to expressing the amounts of force-fitting interference as a size difference (i.e. in microns), the amounts of force-fitting interference could be expressed as a percentage that the outer diameters of the thinner-diameter force-fitting segment 82 and the thicker-diameter force-fitting segment 79 exceed the inner diameter of the shaft hole 60.

In the front-rear direction, dimension (axial length) L2 of the thinner-diameter force-fitting segment 82 is smaller (less) than dimension (axial length) L1 of the thicker-diameter force-fitting segment 79. That is, the thicker-diameter force-fitting segment 79 is longer than the thinner-diameter force-fitting segment 82.

The thinner-diameter-force-fitting guide segment 83 is adjacent to a rear-end portion of the thinner-diameter force-fitting segment 82. The thinner-diameter-force-fitting guide segment 83 is tapered such that its diameter narrows (tapers) in the direction that extends rearward from the rear-end portion of the thinner-diameter force-fitting segment 82.

In the front-rear direction, the thicker-diameter-force-fitting guide segment 80 is disposed between the thinner-diameter force-fitting segment 82 and the thicker-diameter force-fitting segment 79. The thicker-diameter-force-fitting guide segment 80 is adjacent to a rear-end portion of the thicker-diameter force-fitting segment 79. The thicker-diameter-force-fitting guide segment 80 is tapered such that its diameter narrows in the direction that extends rearward from the rear-end portion of the thicker-diameter force-fitting segment 79.

The third clearance segment 81 is disposed between the thinner-diameter force-fitting segment 82 and the thicker-diameter-force-fitting guide segment 80 in the front-rear direction. The third clearance segment 81 is adjacent to a rear-end portion of the thicker-diameter-force-fitting guide segment 80 and is adjacent to a front-end portion of the thinner-diameter force-fitting segment 82. The diameter of the third clearance segment 81 is smaller than diameter Ds2 of the thinner-diameter force-fitting segment 82.

An outer-circumferential surface of the thinner-diameter force-fitting segment 82 and an outer-circumferential surface of the thicker-diameter force-fitting segment 79 are each ground and/or honed such that, in a cross section orthogonal to rotational axis AX, the outer shape of the thinner-diameter force-fitting segment 82 and the outer shape of the thicker-diameter force-fitting segment 79 each become circular shaped.

Diameter Db1 of the bearing-retaining segment 71 is smaller than diameter Df of the fan-force-fitting segment 74. Diameter Ds1 of the thicker-diameter force-fitting segment 79 is smaller than diameter Db1 of the bearing-retaining segment 71. Diameter Di of the sleeve-force-fitting segment 85 is smaller than diameter Ds2 of the thinner-diameter force-fitting segment 82. Diameter Db2 of the bearing-retaining segment 88 is smaller than diameter Di of the sleeve-force-fitting segment 85. That is, in the embodiment, the relation [Df>Db1>Ds1>Ds2>Di>Db2] is established. Owing to the establishment of such a relation, after the rotor shaft 33 has been force-fit into the rotor core 31 from forward of the rotor core 31 and the fan 7 has been inserted (force-fit) onto the rotor shaft 33 from forward of the rotor shaft 33, the second rotor bearing 38 can be inserted (force-fit) onto the rotor shaft 33 from forward of the rotor shaft 33. In addition, after the first sleeve 51 has been inserted onto the rotor shaft 33 from rearward of the rotor shaft 33, the first rotor bearing 37 can be inserted (force-fit) onto the rotor shaft 33 from rearward of the rotor shaft 33.

Figure 11:
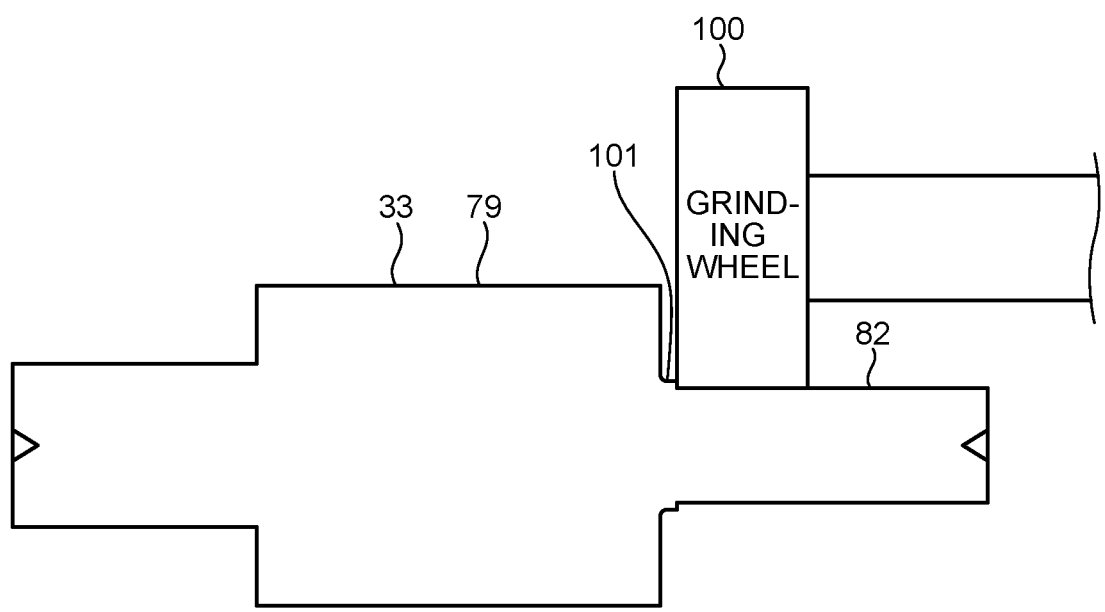
FIG. 11 is a drawing that schematically shows the rotor shaft being ground.

FIG. 11 is a drawing that schematically shows the rotor shaft 33 being ground (or honed). The rotor shaft 33 is formed by machining a rod-shaped blank made of a metal using, for example, a lathe. After the rotor shaft 33 has been machined and its shape determined, it is finished by grinding and/or honing. As shown in FIG. 11, for example, when the thinner-diameter force-fitting segment 82 is to be ground and/or honed, one or more grinding wheels 100 for precisely setting the dimensional size (diameter) of the thinner-diameter force-fitting segment 82 is (are) brought into contact with the outer-circumferential surface of the thinner-diameter force-fitting segment 82. The outer-circumferential surface of the thinner-diameter force-fitting segment 82 is then ground and/or honed using the grinding wheel(s) 100.

Prior to the grinding and/or honing operations, the third clearance segment 81 is provided by machining (e.g., using a lathe). The third clearance segment 81 is provided between the thinner-diameter force-fitting segment 82 and the thicker-diameter force-fitting segment 79 in the front-rear direction. The diameter of the third clearance segment 81 is smaller (less) than the diameter of the thinner-diameter force-fitting segment 82. After the third clearance segment 81 has been machined, the outer-circumferential surface of the thinner-diameter force-fitting segment 82 is ground and/or honed using the grinding wheel(s) 100. Here, it is noted that, if the third clearance segment 81 were not (hypothetically) provided prior to grinding and/or honing the thinner-diameter force-fitting segment 82, then the grinding wheel(s) 100 might interfere with (i.e. contact and damage) the thicker-diameter force-fitting segment 79 while the outer-circumferential surface of the thinner-diameter force-fitting segment 82 is being ground and/or honed using the grinding wheel(s) 100. In the alternative, if interference (contact) between the grinding wheel(s) 100 and the thicker-diameter force-fitting segment 79 is avoided by limiting the axial range of movement of the grinding wheel(s) relative to the rotor shaft 33, then a non-processed portion 101 might undesirably remain at a front-end portion of the thinner-diameter force-fitting segment 82, as can be seen in FIG. 11. Therefore, by advantageously providing the third clearance segment 81 according to the present embodiment, the outer-circumferential surface of the thinner-diameter force-fitting segment 82 can be entirely ground and/or honed using the grinding wheel(s) 100 without interference (contact) of the grinding wheel(s) 100 with the thinner-diameter force-fitting segment 79, thereby avoiding damage to the thinner-diameter force-fitting segment 79 during the grinding and/or honing of the thicker-diameter force-fitting segment 82.

The bearing-retaining segment 71 is held in the second rotor bearing 38. The outer-circumferential surface of the bearing-retaining segment 71 is ground and/or honed. The first clearance segment 72 is adjacent to a rear-end portion of the bearing-retaining segment 71. The first clearance segment 72 is adjacent to a front-end portion of the fan-force-fitting guide segment 73. The diameter of the fan-force-fitting guide segment 73 is larger than the diameter of the bearing-retaining segment 71. The diameter of the first clearance segment 72 is smaller than the diameter of the bearing-retaining segment 71. When the outer-circumferential surface of the bearing-retaining segment 71 is being ground and/or honed using the grinding wheel(s) 100, the first clearance segment 72 reduces the likelihood of interference (contact) of the grinding wheel(s) 100 with the fan-force-fitting guide segment 73, thereby avoiding damage to the fan-force-fitting guide segment 73 during the grinding and/or honing of the outer-circumferential surface of the bearing-retaining segment 71.

The fan-force-fitting segment 74 is force-fit into the fan 7. An outer-circumferential surface of the fan-force-fitting segment 74 is ground and/or honed. The fan-force-fitting guide segment 73 is adjacent to a front-end portion of the fan-force-fitting segment 74. The fan-force-fitting guide segment 73 is tapered such that its diameter narrows in the direction that extends forward from the front-end portion of the fan-force-fitting segment 74.

The second clearance segment 75 is adjacent to a rear-end portion of the fan-force-fitting segment 74. The diameter of the fan-force-fitting segment 74 is larger than diameter Ds1 of the thicker-diameter force-fitting segment 79. The diameter of the second clearance segment 75 is smaller than the diameter of the thicker-diameter force-fitting segment 79. When an outer-circumferential surface of the thicker-diameter force-fitting segment 79 is being ground and/or honed using the grinding wheel(s) 100, the second clearance segment 75 reduces the likelihood of interference (contact) of the grinding wheel(s) 100 with the fan-force-fitting segment 74.

The first intermediate segment 76 and the second intermediate segment 78 each are disposed between the fan-force-fitting segment 74 and the thicker-diameter force-fitting segment 79 in the front-rear direction. In the embodiment, the outer-circumferential surface of the first intermediate segment 76 and the outer-circumferential surface of the second intermediate segment 78 each are not ground or honed. The groove segment 77 is disposed between the first intermediate segment 76 and the second intermediate segment 78 in the front-rear direction.

The sleeve-force-fitting segment 85 is force-fit into the first sleeve 51. The outer-circumferential surface of the sleeve-force-fitting segment 85 is ground and/or honed. The sleeve-force-fitting guide segment 86 is adjacent to a rear-end portion of the sleeve-force-fitting segment 85.

The fourth clearance segment 84 is adjacent to a rear-end portion of the thicker-diameter-force-fitting guide segment 83. The fourth clearance segment 84 is adjacent to a front-end portion of the sleeve-force-fitting segment 85. The diameter of the thinner-diameter-force-fitting guide segment 83 is larger than the diameter of the sleeve-force-fitting segment 85. The diameter of the fourth clearance segment 84 is smaller than the diameter of the sleeve-force-fitting segment 85. When the outer-circumferential surface of the sleeve-force-fitting segment 85 is being ground and/or honed using the grinding wheel(s) 100, the fourth clearance segment 84 reduces the likelihood of interference (contact) of the grinding wheel(s) 100 with the thinner-diameter-force-fitting guide segment 83.

The bearing-retaining segment 88 is held in the rotor bearing 37. The outer-circumferential surface of the bearing-retaining segment 88 is ground and/or honed. The fourth clearance segment 87 is adjacent to a rear-end portion of the sleeve-force-fitting guide segment 86. The fourth clearance segment 87 is adjacent to a front-end portion of the bearing-retaining segment 88. The diameter of the sleeve-force-fitting guide segment 86 is larger than the diameter of the bearing-retaining segment 88. The diameter of the fourth clearance segment 87 is smaller than the diameter of the bearing-retaining segment 88. When the outer-circumferential surface of the bearing-retaining segment 88 is being ground and/or honed using the grinding wheel(s) 100, the fourth clearance segment 87 reduces the likelihood of interference (contact) of the grinding wheel(s) 100 with the sleeve-force-fitting guide segment 86.

Manufacturing Method

Figure 12:
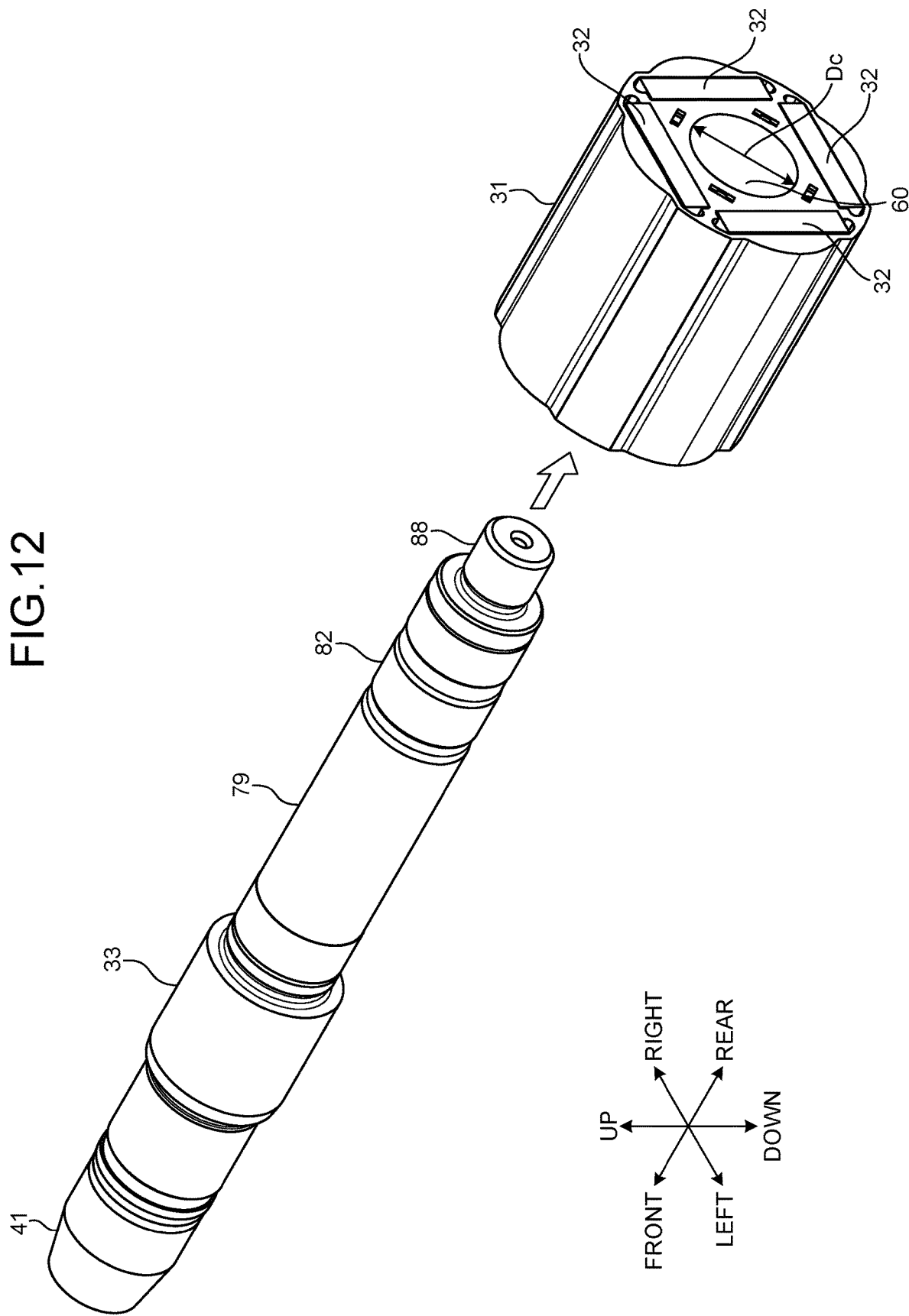
FIG. 12 is an oblique view, viewed from the rear, that shows the rotor shaft, which is to be force-fit into a shaft hole of a rotor core, according to the embodiment.
Figure 13:
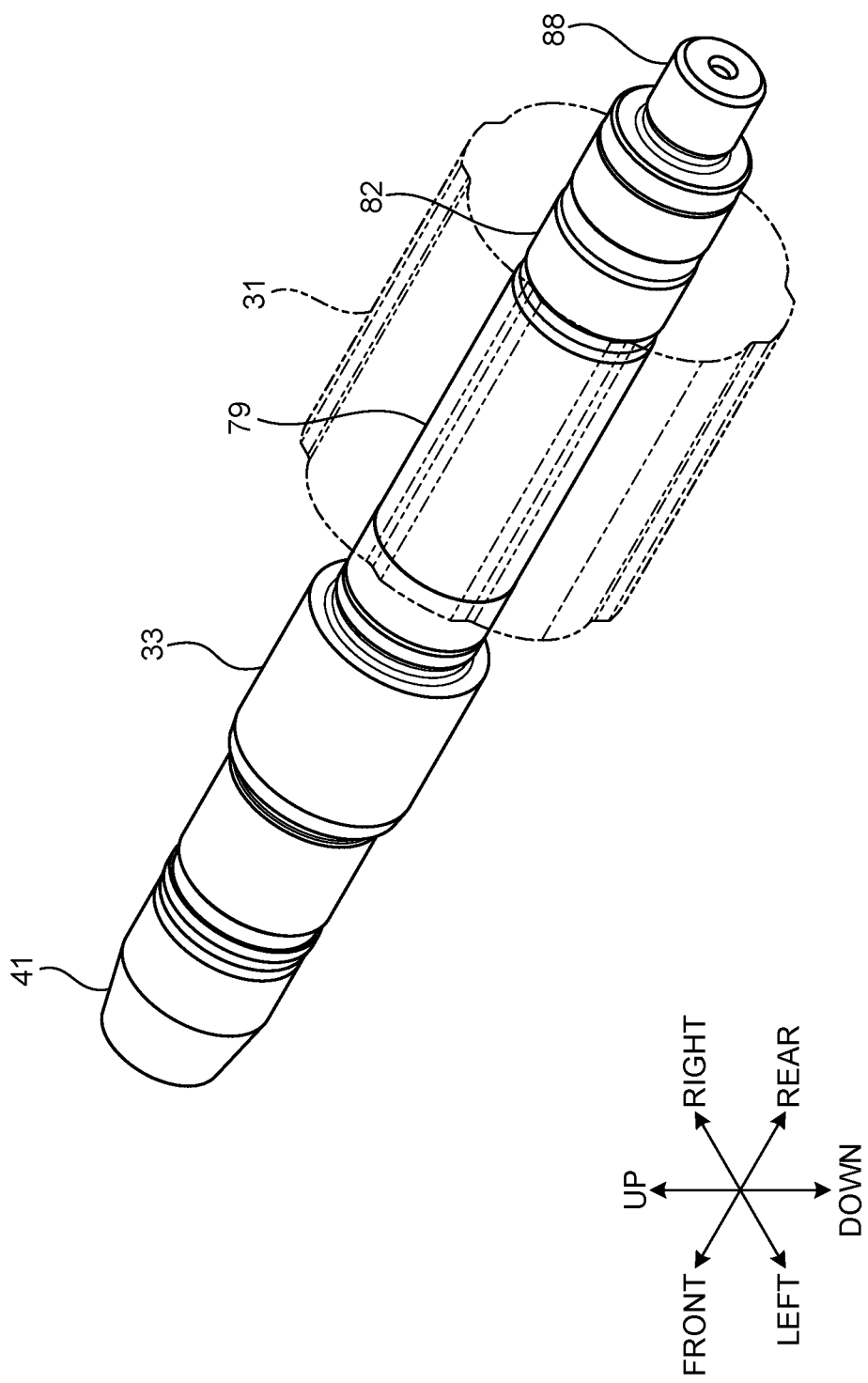
FIG. 13 is an oblique view, viewed from the rear, that shows the rotor shaft, which has been inserted into the shaft hole, according to the embodiment.
Figure 14:
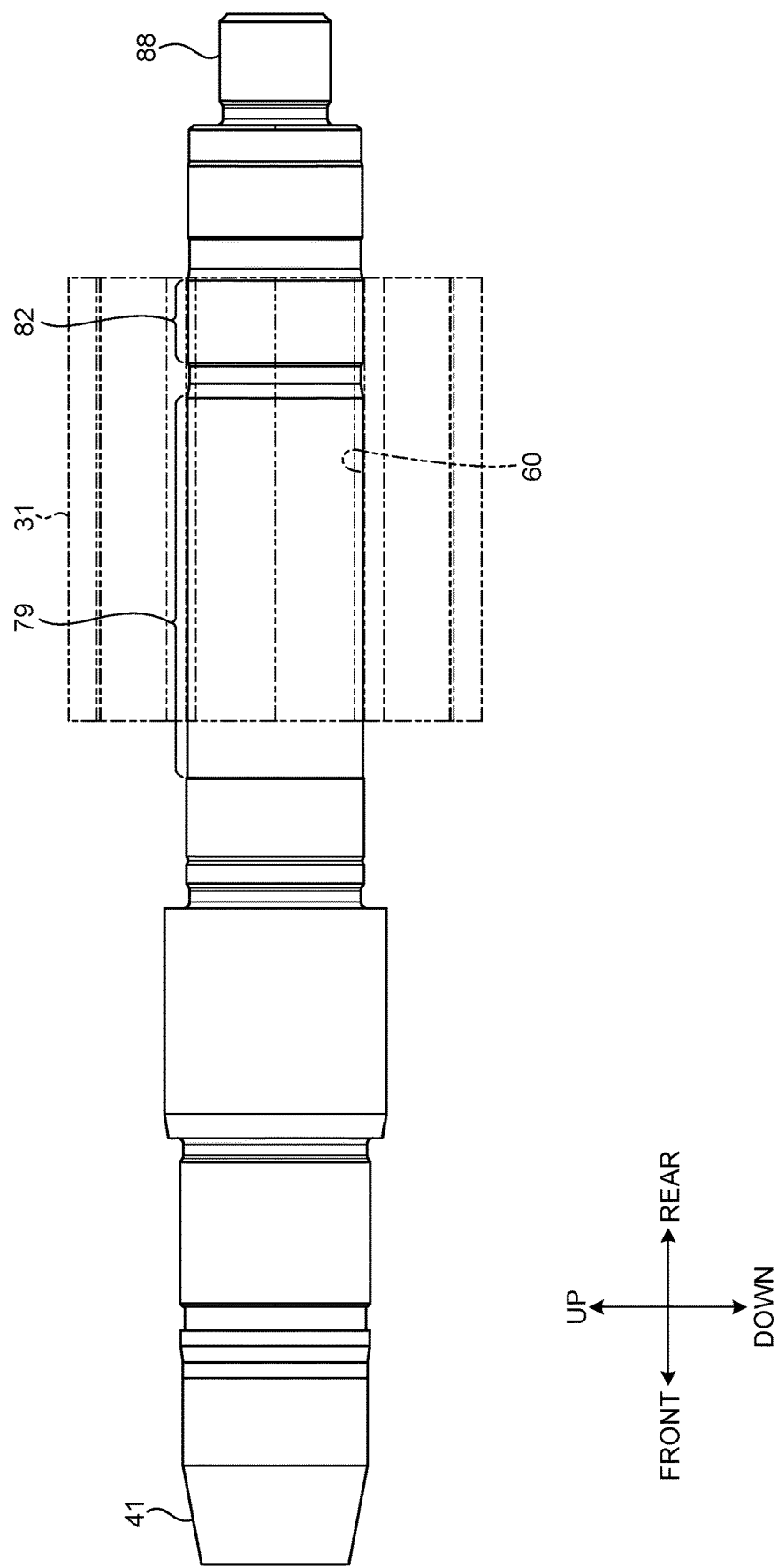
FIG. 14 is a side view that shows the rotor shaft, which has been inserted into the shaft hole, according to the embodiment.

FIG. 12 is an oblique view, viewed from the rear, that shows the rotor shaft 33, which is to be force-fit into the shaft hole 60 of the rotor core 31, according to the embodiment. FIG. 13 is an oblique view, viewed from the rear, that shows the rotor shaft 33, which has been inserted into the shaft hole 60, according to the embodiment. FIG. 14 is a side view that shows the rotor shaft 33, which has been inserted into the shaft hole 60, according to the embodiment. In FIG. 13 and FIG. 14, the rotor core 31 is indicated by virtual lines. FIGS. 15-18 are cross-sectional views that schematically show a series of steps in a representative, non-limiting manufacturing process for force-fitting (inserting) the rotor shaft 33 into the shaft hole 60 according to the embodiment. FIG. 19 is a cross-sectional view that schematically shows the rotor shaft 33, which has been inserted into the shaft hole 60, according to the embodiment.

As shown in FIG. 12, in the embodiment, the rotor shaft 33 is force-fit into the shaft hole 60 from forward of the rotor core 31. The rotor shaft 33 is inserted into the shaft hole 60 from a rear-end portion of the rotor shaft 33. The force-fitting direction of the rotor shaft 33 is determined (set) such that the thicker-diameter force-fitting segment 79 is force-fit into the shaft hole 60 after the thinner-diameter force-fitting segment 82 has previously been force-fit into the shaft hole 60. In other words, the thinner-diameter force-fitting segment 82 is inserted (force-fit) into the shaft hole 60 before the thicker-diameter force-fitting segment 79 is inserted (force-fit) into the shaft hole 60. The thinner-diameter force-fitting segment 82 is then axially slid along the interior surface of the shaft hole 60 until the rear edge of the thinner-diameter force-fitting segment 82 is at least flush, with or emerges from, the rearward side of the shaft hole 60, as can be seen in FIG. 14. In this interference fit state of the thinner-diameter force-fitting segment 82 and the thicker-diameter force-fitting segment 79 within the shaft hole 60, an axially forwardmost portion of the thicker-diameter force-fitting segment 79 preferably is not inserted into the shaft hole 60 and thus remains exposed, as can also be seen in FIG. 14.

In more detail, as shown in FIG. 15, a rear-end portion of the rotor shaft 33 is first inserted into a front-end portion of the shaft hole 60. As the rear-end portion of the rotor shaft 33 is further inserted into the front-end portion of the shaft hole 60 by moving the rotor shaft 33 rearward, the thinner-diameter-force-fitting guide segment 83 (not shown in FIG. 15) will then be inserted into the shaft hole 60. Because the outer-circumferential surface of the thinner-diameter-force-fitting guide segment 83 is tapered such that its diameter narrows in the direction that extends rearward from the rear-end portion of the thinner-diameter force-fitting segment 82, the thinner-diameter force-fitting segment 82 is less likely to get caught on the rear-end portion of the shaft hole 60 as the rotor shaft 33 is being inserted (force-fit) into the shaft hole 60. In addition, because the thinner-diameter force-fitting segment 82 is force-fit into the shaft hole 60 via the thinner-diameter-force-fitting guide segment 83, the central axis of the rotor shaft 33 and the central axis of the shaft hole 60 can be made to coincide with each other, thereby reducing the likelihood of a misalignment.

After the thinner-diameter-force-fitting guide segment 83 has been inserted into the shaft hole 60, the force-fitting of the thinner-diameter force-fitting segment 82 into the shaft hole 60 is begun by moving the rotor shaft 33 further rearward, as shown in FIG. 16. As shown in FIG. 17, by moving the rotor shaft 33 further rearward, the thinner-diameter force-fitting segment 82 is force-fit into the shaft hole 60. Here, it is noted that FIGS. 15-19 are not drawn to scale and the various dimensions are shown in an exaggerated and/or non-realistic forms. For example, in FIGS. 16-19, the outer diameters of the thinner-diameter force-fitting segment 82 and the thicker-diameter force-fitting segment 79 are shown as being larger than the inner diameter of the shaft hole 60, whereas in reality the shaft hole 60 will enlarge and the thinner-diameter force-fitting segment 82 and the thicker-diameter force-fitting segment 79 will compress so that thinner-diameter force-fitting segment 82 and the thicker-diameter force-fitting segment 79 are interference-fit within the shaft hole 60. Furthermore, the difference in diameters of the thinner-diameter force-fitting segment 82 and the thicker-diameter force-fitting segment 79 is exaggerated, whereas in reality the outer dimensions of thinner-diameter force-fitting segment 82 and the thicker-diameter force-fitting segment 79 may differ in the range of tens to hundreds of microns. For example, and without limitation, the lower limit of the size difference between the outer dimension (in particular, outer diameter Ds1) of the thicker-diameter force-fitting segment 79 and the outer dimension (in particular, outer diameter Ds2) of thinner-diameter force-fitting segment 82 may be at least 30 microns, or at least 100 microns, or at least 200 microns, or at least 300 microns, and the upper limit of the size difference between the outer dimensions of the thinner-diameter force-fitting segment 82 and the thicker-diameter force-fitting segment 79 may be 750 microns or less, 700 microns or less, 600 microns or less, 500 microns or less or 400 microns or less. Suitable ranges of the size difference between the outer dimensions of the thinner-diameter force-fitting segment 82 and the thicker-diameter force-fitting segment 79 may be set using any of the above-mentioned lower and upper limits of the difference in outer dimensions. In this regard, it is further noted that the manufacturing tolerance range of the rotor shaft 33 (in particular, for the thinner-diameter force-fitting segment 82 and the thicker-diameter force-fitting segment 79) is preferably set to be smaller than the lower limit of the size difference obtained by subtracting the (nominal) outer diameter Ds2 of the thinner-diameter force-fitting segment from the (nominal) outer diameter Ds1 of the thicker-diameter force-fitting segment. For example, and without limitation, if the (nominal) size difference (Ds1−Ds2) is intended to be, e.g., 400 microns (0.4 mm), the manufacturing tolerance is, e.g., preferably +/−50 microns (0.05 mm), such that the maximum error with regard to the manufacturing tolerance is 100 microns (0.1 mm). The manufacturing tolerance is preferably within the range from +/−10 microns (0.01 mm) to +/−40 microns (0.04 mm). The (nominal) size difference is preferably in the range, e.g., of 30-500 microns (0.03 mm to 0.5 mm), e.g., microns, as long as the nominal size difference exceeds the manufacturing tolerance.

After the thinner-diameter force-fitting segment 82 has been force-fit into the shaft hole 60, the thicker-diameter-force-fitting guide segment 80 is then inserted into the shaft hole 60 by moving the rotor shaft 33 further rearward. Because the outer-circumferential surface of the thicker-diameter-force-fitting guide segment 80 is tapered such that its diameter narrows in the direction that extends rearward from a rear-end portion of the thicker-diameter force-fitting segment 79, the thicker-diameter force-fitting segment 79 is less likely to get caught on the rear-end portion of the shaft hole 60 (than an embodiment, in which the thicker-diameter force-fitting segment 79 is not provided).

After the thicker-diameter-force-fitting guide segment 80 has been inserted into the shaft hole 60, the force-fitting of the thicker-diameter force-fitting segment 79 into the shaft hole 60 is begun by moving the rotor shaft 33 further rearward, as shown in FIG. 18.

By moving the rotor shaft 33 further rearward, the thinner-diameter force-fitting segment 82 and the thicker-diameter force-fitting segment 79 are each force-fit into the shaft hole 60, as shown in FIG. 13, FIG. 14, and FIG. 19. As shown in FIG. 14, a rear-end portion of the thinner-diameter force-fitting segment 82 is disposed more frontward than a rear-end portion of the rotor core 31. It is noted that, in the front-rear direction, the location of a rear-end portion of the thinner-diameter force-fitting segment 82 and the location of a rear-end portion of the rotor core 31 may coincide. A front-end portion of the thicker-diameter force-fitting segment 79 is disposed more frontward than a front-end portion of the rotor core 31.

After the rotor shaft 33 has been moved rearward relative to the rotor core 31 and the thinner-diameter force-fitting segment 82 and the thicker-diameter force-fitting segment 79 have been force-fit into the shaft hole 60, the first sleeve 51 is force-fit onto the sleeve-force-fitting segment 85 from rearward of the rotor shaft 33. Because the sleeve-force-fitting guide segment 86 is provided on the rear side of the sleeve-force-fitting segment 85, the first sleeve 51 can be smoothly force-fit onto the sleeve-force-fitting segment 85. When the first sleeve 51 is force-fit onto the rotor shaft 33 via the sleeve-force-fitting guide segment 86, the central axis of the rotor shaft 33 and the central axis of the first sleeve 51 can be made to coincide with each other. After the first sleeve 51 has been force-fit onto the sleeve-force-fitting segment 85 from rearward of the rotor shaft 33, the second rotor bearing 37 is inserted (force-fit) onto the bearing-retaining segment 88 from rearward of the rotor shaft 33.

The fan 7 is force-fit onto the fan-force-fitting segment 74 from forward of the rotor shaft 33. Because the fan-force-fitting guide segment 73 is provided on the front side of the fan-force-fitting segment 74, the fan 7 is smoothly force-fit onto the fan-force-fitting segment 74. After the fan 7 has been force-fit onto the fan-force-fitting segment 74 from forward of the rotor shaft 33, the second rotor bearing 38 is inserted (force-fit) onto the bearing-retaining segment 71 from forward of the rotor shaft 33.

EFFECTS

As explained above, in the embodiment, the motor 6, which is a brushless motor, comprises: the rotor 25, which rotates about rotational axis AX; and the stator 24, which is disposed around the rotor 25 and comprises the coils 29. The rotor 25 comprises the rotor core 31 and the rotor shaft 33, which is disposed in the shaft hole 60 of the rotor core 31. The rotor shaft 33 comprises: the thinner-diameter force-fitting segment 82, which is force-fit into the shaft hole 60 with the first amount of force-fitting interference; and the thicker-diameter force-fitting segment 79, which is disposed at a location different or separated (spaced apart in the axial direction) from that of the thinner-diameter force-fitting segment 82 in the front-rear direction parallel to or colinear with rotational axis AX and which is force-fit into the shaft hole 60 with the second amount of force-fitting interference that is larger than the first amount of force-fitting interference.

According to the above-mentioned configuration, the rotor core 31 and the rotor shaft 33 are fixed to each other by force-fitting both the thinner-diameter force-fitting segment 82 and the thicker-diameter force-fitting segment 79 into the shaft hole 60 of the rotor core 31. Due to this design, undesirable bending of the rotor shaft 33 is less likely to occur or may even be avoided entirely during the making (formation) of the thinner-diameter force-fitting segment 82 and the thicker-diameter force-fitting segment 79, because these segments 79, 82 can be formed by grinding and/or honing, rather than forming linear protuberances as in the above-described prior art. In addition, an offset (mis-alignment) between the central (rotational) axis of the rotor core 31 and the central (rotational) axis of the rotor shaft 33 is less likely to occur or may even be avoided entirely owing to the surface force-fit (as opposed to line force-fits, which occur in the above-described prior art), because both the outer-circumferential surface of the thinner-diameter force-fitting segment 82 and the outer-circumferential surface of the thicker-diameter force-fitting segment 79 are brought into tight (snug, high-pressure) contact with the (entire) inner-circumferential surface of the shaft hole 60, thereby providing a larger area surface contact than is possible in the line force-fits of the above-described prior art. Consequently, the rotational balance of the rotor 25 is less likely to be detrimentally affected by the force-fitting operations. In addition, the rotor core 31 and the rotor shaft 33 are rigidly fixed to each other by the surface force-fitting of both the outer-circumferential surface of the thinner-diameter force-fitting segment 82 and the outer-circumferential surface of the thicker-diameter force-fitting segment 79 into the inner-circumferential surface of the shaft hole 60. Consequently, rotation of the rotor core 31 and the rotor shaft 33 relative to each other in an undesirable manner, movement of the rotor core 31 and the rotor shaft 33 relative to each other in the axial direction in an undesirable manner, and the like are less likely to occur or may be avoided entirely. Accordingly, a decrease in the performance of the motor 6 is less likely to occur or may be avoided entirely by the present design of the rotor shaft 33 and force-fitting process.

In the embodiment, in a cross section orthogonal to rotational axis AX, the outer shapes of the thinner-diameter force-fitting segment 82 and the thicker-diameter force-fitting segment 79 each are circular shaped.

According to the above-mentioned configuration, an advantageous rotational balance of the rotor 25 can be achieved.

In the embodiment, the thinner-diameter force-fitting segment 82 is disposed more rearward than the thicker-diameter force-fitting segment 79. Furthermore, the rotor shaft 33 comprises the thinner-diameter-force-fitting guide segment 83, the diameter of which narrows in the direction that extends rearward from the rear-end portion of the thinner-diameter force-fitting segment 82.

According to the above-mentioned configuration, the thicker-diameter-force-fitting guide segment 83 makes it easier to force-fit the thinner-diameter force-fitting segment 82 into the shaft hole 60. In addition, owing to the thinner-diameter-force-fitting guide segment 83, damage to the rotor core 31 is less likely to occur or may be avoided entirely because the generation of excessive stress concentration in the rotor core 31 when the thinner-diameter force-fitting segment 82 is force-fit into the shaft hole 60 is less likely to occur or may be avoided entirely.

In the embodiment, the rotor shaft 33 comprises the thicker-diameter-force-fitting guide segment 80, which is disposed between the thinner-diameter force-fitting segment 82 and the thicker-diameter force-fitting segment 79 in the front-rear direction, and the diameter of which narrows in the direction that extends rearward from the rear-end portion of the thicker-diameter force-fitting segment 79.

According to the above-mentioned configuration, the thicker-diameter-force-fitting guide segment 80 makes it easier to force-fit the thicker-diameter force-fitting segment 79 into the shaft hole 60. In addition, owing to the thicker-diameter-force-fitting guide segment 80, damage to the rotor core 31 is less likely to occur or may be avoided entirely because the generation of excessive stress concentration in the rotor core 31 when the thicker-diameter force-fitting segment 79 is force-fit into the shaft hole 60 is less likely to occur or may be avoided entirely.

In the embodiment, the rotor shaft 33 comprises the third clearance segment 81, which is disposed between the thinner-diameter force-fitting segment 82 and the thicker-diameter-force-fitting guide segment 80 in the front-rear direction, and the diameter of which is smaller than the diameter of the thinner-diameter force-fitting segment 82.

According to the above-mentioned configuration, the outer-circumferential surface of the thinner-diameter force-fitting segment 82 can be ground and/or honed using one or more grinding wheel(s) without interference of the grinding wheel(s) with the thicker-diameter force-fitting segment 79 owing to the third clearance segment 81.

In the embodiment, the dimension (length) of the thinner-diameter force-fitting segment 82 is smaller (less) than the dimension (length) of the thicker-diameter force-fitting segment 79 in the front-rear direction.

According to the above-mentioned configuration, after the thinner-diameter force-fitting segment 82 has been force-fit into the shaft hole 60, the thicker-diameter force-fitting segment 79 can be more easily force-fit into the shaft hole 60. Furthermore, because the thicker-diameter force-fitting segment 79 is longer than the thinner-diameter force-fitting segment 82, the rotor core 31 and the rotor shaft 33 are rigidly fixed to each other owing to the fact that the (longer) thicker-diameter force-fitting segment 79 is fitted in the shaft hole with the second (larger) force-fitting interference.

In the embodiment, the thinner-diameter force-fitting segment 82 is disposed rearward of the thicker-diameter force-fitting segment 79. In addition, a rear-end portion of the thinner-diameter force-fitting segment 82 is disposed rearward of the rear-end portion of the rotor core 31. Furthermore, a front-end portion of the thicker-diameter force-fitting segment 79 is disposed forward of the front-end portion of the rotor core 31.

According to the above-mentioned configuration, because the thinner-diameter force-fitting segment 82 is not disposed rearward of the rear-end portion of the rotor core 31, for example, the first sleeve 51 can be more easily force-fit onto the rotor shaft 33 rearward of the rotor core 31. In addition, because the front-end portion of the thicker-diameter force-fitting segment 79 is disposed (extends) forward of the front-end portion of the rotor core 31, a large surface area of contact between the outer-circumferential surface of the thicker-diameter force-fitting segment 79 and the inner-circumferential surface of the shaft hole 60 is achieved such that the rotor core 31 and the rotor shaft 33 are rigidly fixed to each other.

In the embodiment, the electric work machine 1 comprises: the above-mentioned motor 6; and the blade holder 10, which is a tool-accessory retaining segment, on which the blade, which is a tool accessory, is mounted and which is driven by the rotational force of the motor 6.

According to the above-mentioned configuration, because the design enables the rotor 25 to be well balanced rotationally, generation of vibration and noise during an operation using the electric work machine 1 can be curtailed.

In the embodiment, the electric work machine 1 comprises: the pinion gear 41, which is provided on a front-end portion of the rotor shaft 33; the fan 7, which is inserted (force-fit) onto the rotor shaft 33 from the front-end-portion side of the rotor shaft 33; the second rotor bearing 38, which is inserted (force-fit) onto the rotor shaft 33 from the front-end-portion side of the rotor shaft 33 after the fan 7 has been inserted onto the rotor shaft 33; the rotor core 31, which is force-fit onto the rotor shaft 33 from the rear-end-portion side of the rotor shaft 33; and the first rotor bearing 37, which is inserted onto the rotor shaft 33 from the rear-end-portion side of the rotor shaft 33 after the fan 7 has been force-fit onto the rotor shaft 33 from the rear-end-portion side of the rotor shaft 33.

According to the above-mentioned configuration, the electric work machine 1 can be manufactured in a highly efficient manner.

In the embodiment, the method of manufacturing the motor 6 comprising the rotor 25, which rotates about rotational axis AX, and the stator 24, which is disposed around the rotor 25 and comprises the coils 29, comprises: force-fitting, into the shaft hole 60 of the rotor core 31 extending in the front-rear direction parallel to rotational axis AX, the rotor shaft 33 comprising the thinner-diameter force-fitting segment 82, which is force-fit into the shaft hole 60 with the first amount of force-fitting interference, and the thicker-diameter force-fitting segment 79, which is disposed at a location different from that of the thinner-diameter force-fitting segment 82 in the front-rear direction parallel to rotational axis AX and which is force-fit into the shaft hole 60 with the second amount of force-fitting interference that is larger than the first amount of force-fitting interference.

According to the above-mentioned method steps, the rotor core 31 and the rotor shaft 33 are fixed to each other by force-fitting both the thinner-diameter force-fitting segment 82 and the thicker-diameter force-fitting segment 79 into the shaft hole 60 of the rotor core 31. Owing to this design, undesirable bending of the rotor shaft 33 is less likely to occur or may even be avoided entirely during the making (formation) of the thinner-diameter force-fitting segment 82 and the thicker-diameter force-fitting segment 79, as compared to known methods. In addition, offset between the central axis of the rotor core 31 and the central axis of the rotor shaft 33 is less likely to occur or may even be avoided entirely owing to the surface force-fitting, because both the outer-circumferential surface of the thinner-diameter force-fitting segment 82 and the outer-circumferential surface of the thicker-diameter force-fitting segment 79 are brought into tight (snug, high-pressure) contact with the inner-circumferential surface of the shaft hole 60. Consequently, a satisfactory rotational balance of the rotor 25 can be achieved. In addition, the rotor core 31 and the rotor shaft 33 are rigidly fixed to each other by the surface force-fit of the outer-circumferential surface of the thinner-diameter force-fitting segment 82 and the outer-circumferential surface of the thicker-diameter force-fitting segment 79 within the inner-circumferential surface of the shaft hole 60. Herein, "surface force-fit" means that, in planes perpendicular to the rotational axis of the rotor shaft 33, there are continuous line contacts of the thinner-diameter force-fitting segment 82 and the thinner-diameter force-fitting segment 82 with the shaft hole 60, rather than point contacts as in the above-described prior art design. Consequently, rotation (slippage) of the rotor core 31 and the rotor shaft 33 relative to each other in an undesirable manner, movement (slippage) of the rotor core 31 and the rotor shaft 33 relative to each other in the axial direction in an undesirable manner, and the like are less likely to occur than in known designs, thereby enabling improved performance of the motor 6.

In the embodiment, after the thinner-diameter force-fitting segment 82 has been force-fit into the shaft hole 60, the thicker-diameter force-fitting segment 79 is force-fit into the shaft hole 60.

According to the above-mentioned method steps, the thinner-diameter force-fitting segment 82 and the thinner-diameter force-fitting segment 79 can both be force-fit into the shaft hole 60 in a suitably tight manner. On the other hand, if the thicker-diameter force-fitting segment 79 were to instead (hypothetically) be force-fit into the shaft hole 60 prior to force-fitting of the thinner-diameter force-fitting segment 82, the rotor core 31 would plastically deform such that the inner diameter of the shaft hole 60 enlarges in accordance with (to be the size of) the diameter of the thicker-diameter force-fitting segment 79. In this case, the strength of the force-fit of the thinner-diameter force-fitting segment 82 in the shaft hole 60 would be reduced due to the first amount of force-fitting interference being reduced. That is, the inner diameter of the shaft hole 60 will be enlarged in accordance with the diameter of the thicker-diameter force-fitting segment 79, thereby possibly becoming be larger than the outer diameter of the thinner-diameter force-fitting segment 82 (or at least becoming larger than the original (nominal) inner diameter of the shaft hole 60), and thereby reducing the actual amount of interference as compared to the nominal (expected) first amount of force-fitting interference. Thus, by force-fitting the thinner-diameter force-fitting segment 82 into the shaft hole 60 prior to the force-fitting of the thicker-diameter force-fitting segment 79, even through the inner diameter of the shaft hole 60 may enlarge in accordance with the diameter of the thinner-diameter force-fitting segment 82, the (enlarged) inner diameter of the enlarged shaft hole 60 will still be smaller than the outer diameter of the thicker-diameter force-fitting segment 79, and therefore the thicker-diameter force-fitting segment 79 can be force-fit into the shaft hole 60 in a suitably tight manner.

In the embodiment, the thinner-diameter force-fitting segment 82 is disposed rearward of the thicker-diameter force-fitting segment 79. In addition, the thinner-diameter-force-fitting guide segment 83, the diameter of which narrows in the direction that extends rearward from a rear-end portion of the thinner-diameter force-fitting segment 82, is provided on the rotor shaft 33. After the thinner-diameter-force-fitting guide segment 83 has been inserted onto the shaft hole 60, the thinner-diameter force-fitting segment 82 is force-fit into the shaft hole 60.

According to the above-mentioned method steps, the thinner-diameter-force-fitting guide segment 83 facilitates the force-fitting of the thinner-diameter force-fitting segment 82 into the shaft hole 60. In addition, owing to the thinner-diameter-force-fitting guide segment 83, damage to the rotor core 31 is less likely to occur or may be avoided entirely because the generation of excessive stress concentration in the rotor core 31 when the thinner-diameter force-fitting segment 82 is force-fit into the shaft hole 60 is curtailed (reduced).

In the embodiment, the thicker-diameter-force-fitting guide segment 80, the diameter of which narrows in the direction that extends rearward from a rear-end portion of the thicker-diameter force-fitting segment 79, is provided on the rotor shaft 33 between the thinner-diameter force-fitting segment 82 and the thicker-diameter force-fitting segment 79 in the front-rear direction. After the thicker-diameter-force-fitting guide segment 80 has been inserted into the shaft hole 60, the thicker-diameter force-fitting segment 79 is force-fit into the shaft hole 60.

According to the above-mentioned method steps, the thicker-diameter-force-fitting guide segment 80 facilitates the force-fitting of the thicker-diameter force-fitting segment 79 into the shaft hole 60. In addition, owing to the thicker-diameter-force-fitting guide segment 80, damage to the rotor core 31 is less likely to occur or may be avoided entirely because the generation of excessive stress concentration in the rotor core 31 when the thicker-diameter force-fitting segment 79 is force-fit into the shaft hole 60 is curtailed (reduced).

In the embodiment, in the front-rear direction, the dimension (length) of the thinner-diameter force-fitting segment 82 is smaller (less) than the dimension (length) of the thicker-diameter force-fitting segment 79.

According to the above-mentioned method steps, because the thinner-diameter force-fitting segment 82 is first to be force-fit into the shaft hole 60, when the thicker-diameter force-fitting segment 79 is subsequently force-fit into the shaft hole 60, the rotor shaft 33 can be easily force-fit into the shaft hole 60. In addition, because the thicker-diameter force-fitting segment 79 is longer than the thinner-diameter force-fitting segment 82, the rotor core 31 and the rotor shaft 33 are rigidly fixed to each other.

In the embodiment, the outer-circumferential surface of the thinner-diameter force-fitting segment 82 and the outer-circumferential surface of the thicker-diameter force-fitting segment 79 are each ground and/or honed such that, in a cross section orthogonal to rotational axis AX, the outer shapes of the thinner-diameter force-fitting segment 82 and the thicker-diameter force-fitting segment 79 each become circular shaped.

According to the above-mentioned method steps, by using grinding and/or honing to manufacture (form) the thinner-diameter force-fitting segment 82 and the thicker-diameter force-fitting segment 79, bending of the rotor shaft 33 in an undesirable manner is less likely to occur or may be avoided entirely, thereby enabling a satisfactory rotational balance of the rotor 25.

In the embodiment, after the third clearance segment 81, the diameter of which is smaller than the diameter of the thinner-diameter force-fitting segment 82, has been provided between the thinner-diameter force-fitting segment 82 and the thicker-diameter force-fitting segment 79 in the front-rear direction, the outer-circumferential surface of the thinner-diameter force-fitting segment 82 is ground and/or honed.

According to the above-mentioned method steps, the outer-circumferential surface of the thinner-diameter force-fitting segment 82 can be ground and/or honed using the grinding wheel(s) without interference of the grinding wheel (s) with the thicker-diameter force-fitting segment 79 owing to the third clearance segment 81.

OTHER EMBODIMENTS

In the embodiments described above, it is assumed that the electric work machine 1 is a reciprocating saw, which is one type of power tool according to the present teachings. However, power tools according to the present teachings are not limited to being a reciprocating saw. Illustrative examples of power tools according to the present teachings include, without limitation, an impact driver, a driver-drill, a hammer driver-drill, an angle drill, a screwdriver, a hammer, a hammer drill, a circular saw, etc.

In additional embodiments according to the present teachings, the electric work machine 1 may be a horticultural tool (outdoor power equipment), such as a chain saw, a hedge trimmer, a mowing machine, a lawn mower, a blower, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved brushless motors and power tools utilizing such brushless motors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
2 Rear housing
2L Left housing
2R Right housing
2S Screw
3 Front housing
4 Battery-mounting part
5 Controller
6 Motor
7 Fan
8 Crank mechanism
9 Slider
10 Blade holder
11 Guide shoe
12 Motor-housing portion
13 Handle portion
14 Battery-holding portion
15 Trigger lever
16 Lock-off button
17 Window
18 First air-suction port
19 Second air-suction port
20 Hook receiver
21 Suspending hook
22 Battery pack
23 Controller case
24 Stator
25 Rotor
26 Stator core
27 Rear insulator
28 Front insulator
29 Coil
30 Busbar
31 Rotor core
31A Magnet hole
31B Air gap
31C Crimped part
32 Permanent magnet
33 Rotor shaft
34 Sensor board
35 Motor case
36 Crank case
37 Rotor bearing
38 Rotor bearing
39 Retaining plate
40 Screw
41 Pinion gear
42 Bevel gear
43 Eccentric pin
44 Linking pin
45 Connecting rod
46 Holder
47 Slider guide
48 Slide bar
49 Shoe
51 First sleeve
52 Second sleeve
60 Shaft hole
71 Bearing-retaining segment
72 First clearance segment
73 Fan-force-fitting guide segment
74 Fan-force-fitting segment
75 Second clearance segment
76 First intermediate segment
77 Groove portion
78 Second intermediate segment
79 Thicker-diameter force-fitting segment
80 Thicker-diameter-force-fitting guide segment
81 Third clearance segment
82 Thinner-diameter force-fitting segment
83 Thinner-diameter-force-fitting guide segment
84 Fourth Clearance segment
85 Sleeve-force-fitting segment
86 Sleeve-force-fitting guide segment
87 Clearance segment
88 Bearing-retaining segment
100 Grinding wheel(s)
101 Non-processed portion
Dc Inner diameter
Ds1 Diameter
Ds2 Diameter
L1 Dimension
L2 Dimension
AX Rotational axis

The invention claimed is:
1. A brushless motor comprising:
a rotor configured to be rotatable about a rotational axis; and
a stator disposed around the rotor and comprising one or more coils;
wherein:
the rotor comprises a rotor shaft disposed in a shaft hole of a rotor core;
the rotor shaft comprises: a thinner-diameter force-fitting segment; and a thicker-diameter force-fitting segment disposed at a location axially spaced apart from the thinner-diameter force-fitting segment in a front-rear direction parallel to the rotational axis;
the thinner-diameter force-fitting segment is force-fit into the shaft hole with a first amount of force-fitting interference;

the thicker-diameter force-fitting segment is force-fit into the shaft hole with a second amount of force-fitting interference; and the second amount of force-fitting interference is larger than the first amount of force-fitting interference.

2. The brushless motor according to claim 1, wherein the thinner-diameter force-fitting segment and the thicker-diameter force-fitting segment each have a circular shaped outer circumference in a cross section orthogonal to the rotational axis.

3. The brushless motor according to claim 1, wherein:
the thinner-diameter force-fitting segment is disposed rearward of the thicker-diameter force-fitting segment in the front-rear direction; and
the rotor shaft further comprises a thinner-diameter-force-fitting guide segment adjacent to a rear-end portion of the thinner-diameter force-fitting segment and having an outer diameter that narrows in a direction that extends rearward from the rear-end portion of the thinner-diameter force-fitting segment.

4. The brushless motor according to claim 1, wherein:
the rotor shaft further comprises a thicker-diameter-force-fitting guide segment disposed between the thinner-diameter force-fitting segment and the thicker-diameter force-fitting segment in the front-rear direction; and
the thicker-diameter-force-fitting guide segment has an outer diameter that narrows in the direction that extends rearward from a rear-end portion of the thicker-diameter force-fitting segment in the front-rear direction.

5. The brushless motor according to claim 1, wherein:
the rotor shaft further comprises a clearance segment disposed between the thinner-diameter force-fitting segment and the thicker-diameter-force-fitting guide segment in the front-rear direction; and
the clearance segment has an outer diameter that is smaller than the outer diameter of the thinner-diameter force-fitting segment.

6. The brushless motor according to claim 1, wherein:
the thinner-diameter force-fitting segment has a first axial length in the front-rear direction;
the thicker-diameter force-fitting segment has a second axial length in the front-rear direction; and
the first axial length is shorter than the second axial length.

7. The brushless motor according to claim 1, wherein:
the thinner-diameter force-fitting segment is disposed rearward of the thicker-diameter force-fitting segment in the front-rear direction;
a rear-end portion of the thinner-diameter force-fitting segment extends forward of a rear-end portion of the rotor core in the front-rear direction; and
a front-end portion of the thicker-diameter force-fitting segment extends forward of a front-end portion of the rotor core in the front-rear direction.

8. The brushless motor according to claim 1, wherein:
the thicker-diameter force-fitting segment has a first outer diameter;
the thinner-diameter force-fitting segment has a second outer diameter; and
the first outer diameter is greater than the second outer diameter by an amount in the range of 30-500 microns.

9. The brushless motor according to claim 8, wherein the first and second outer diameters are each in the range of 8-15 mm.

10. An electric work machine comprising:
the brushless motor according to claim 1; and
a tool-accessory retaining segment, on or in which a tool accessory is mountable, the tool-accessory retaining segment being drivable using rotational force generated by the brushless motor.

11. The electric work machine according to claim 10, further comprising:
a gear provided on one-end portion of the rotor shaft;
a fan force-fit onto the rotor shaft from one-end-portion side of the rotor shaft;
a first bearing force-fit onto the rotor shaft via a first end of the rotor shaft; and
a second bearing force-fit onto the rotor shaft via a second end of the rotor shaft;
wherein the rotor core is force-fit onto the rotor shaft via the second end of the rotor shaft.

12. A method of manufacturing a brushless motor comprising a rotor configured to be rotatable about a rotational axis and comprising a rotor shaft and a rotor core, and a stator disposed around the rotor and comprising one or more coils, the method comprising:
force-fitting a thinner-diameter force-fitting segment of the rotor shaft into a shaft hole of the rotor core that extends in a front-rear direction parallel to the rotational axis with a first amount of force-fitting interference; and
force-fitting a thicker-diameter force-fitting segment of the rotor shaft, which is disposed at a location axially spaced apart from the thinner-diameter force-fitting segment in the front-rear direction parallel to the rotational axis, into the shaft hole with a second amount of force-fitting interference that is larger than the first amount of force-fitting interference.

13. The method of manufacturing the brushless motor according to claim 12, wherein the thinner-diameter force-fitting segment is force-fit into the shaft hole before the thicker-diameter force-fitting segment is force-fit into the shaft hole.

14. The method of manufacturing the brushless motor according to claim 12, wherein:
the thinner-diameter force-fitting segment is disposed rearward of the thicker-diameter force-fitting segment in the front-rear direction;
a thinner-diameter-force-fitting guide segment is provided on the rotor shaft and has an outer diameter that narrows in the direction that extends rearward from a rear-end portion of the thinner-diameter force-fitting segment in the front-rear direction; and
the thinner-diameter-force-fitting guide segment is inserted into the shaft hole before the thinner-diameter force-fitting segment is force-fit into the shaft hole.

15. The method of manufacturing the brushless motor according to claim 12, wherein:
a thicker-diameter-force-fitting guide segment is provided on the rotor shaft between the thinner-diameter force-fitting segment and the thicker-diameter force-fitting segment in the front-rear direction, the thicker-diameter-force-fitting guide segment having an outer diameter that narrows in the direction that extends rearward from a rear-end portion of the thicker-diameter force-fitting segment in the front-rear direction; and
the thicker-diameter-force-fitting guide segment is inserted into the shaft hole before the thicker-diameter force-fitting segment is force-fit into the shaft hole.

16. The method of manufacturing the brushless motor according to claim 12, wherein:
the thinner-diameter force-fitting segment has a first axial length in the front-rear direction;

the thicker-diameter force-fitting segment has a second axial length in the front-rear direction; and the first axial length is shorter than the second axial length.

17. The method of manufacturing the brushless motor according to claim 12, further comprising:

grinding and/or honing an outer-circumferential surface of the thinner-diameter force-fitting segment and an outer-circumferential surface of the thicker-diameter force-fitting segment such that, in a cross section orthogonal to the rotational axis, outer peripheries of the thinner-diameter force-fitting segment and the thicker-diameter force-fitting segment each become circular shaped.

18. The method of manufacturing the brushless motor according to claim 12, further comprising:

providing a clearance segment between the thinner-diameter force-fitting segment and the thicker-diameter force-fitting segment in the front-rear direction, the clearance segment having an outer diameter that is smaller than the outer diameter of the thinner-diameter force-fitting segment; and thereafter, grinding and/or honing an outer-circumferential surface of the thinner-diameter force-fitting segment.

19. The method of manufacturing the brushless motor according to claim 12, wherein:

the thicker-diameter force-fitting segment has a first outer diameter;

the thinner-diameter force-fitting segment has a second outer diameter; and the first outer diameter is greater than the second outer diameter by an amount in the range of 30-500 microns.

20. The method of manufacturing the brushless motor according to claim 19, wherein the first and second outer diameters are each in the range of 8-15 mm.

* * * * *